United States Patent
Matsudaira et al.

(10) Patent No.: US 9,465,564 B2
(45) Date of Patent: Oct. 11, 2016

(54) PRINTING CONTROL APPARATUS THAT CONTROLS SWITCHING BETWEEN COLOR MODE AND MONOCHROME MODE

(71) Applicant: RISO KAGAKU CORPORATION, Tokyo (JP)

(72) Inventors: Kahiro Matsudaira, Tsukuba (JP); Masaki Ozawa, Tsukuba (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 14/484,775

(22) Filed: Sep. 12, 2014

(65) Prior Publication Data
US 2015/0085304 A1 Mar. 26, 2015

(30) Foreign Application Priority Data
Sep. 20, 2013 (JP) .................................. 2013-194794

(51) Int. Cl.
| G06F 3/12 | (2006.01) |
| H04N 1/32 | (2006.01) |
| H04N 1/46 | (2006.01) |
| G06K 15/02 | (2006.01) |

(52) U.S. Cl.
CPC ........... G06F 3/1212 (2013.01); G06F 3/1253 (2013.01); G06K 15/1878 (2013.01); G06K 15/1881 (2013.01); H04N 1/32 (2013.01); H04N 1/46 (2013.01)

(58) Field of Classification Search
None
See application file for complete search history.

(56) References Cited

U.S. PATENT DOCUMENTS

| 7,612,910 | B2 * | 11/2009 | Oki | ................................ 358/1.9 |
| 8,094,335 | B2 * | 1/2012 | Eki | .......................... H04N 1/56 |
| | | | | 358/1.15 |
| 2003/0202196 | A1 * | 10/2003 | Ooki | ..................... G06K 15/02 |
| | | | | 358/1.9 |
| 2004/0223188 | A1 * | 11/2004 | Toda | ..................... G06K 15/02 |
| | | | | 358/2.1 |
| 2006/0279813 | A1 * | 12/2006 | Ozawa | ..................... H04N 1/46 |
| | | | | 358/538 |
| 2007/0140571 | A1 * | 6/2007 | Fan | .................... G06K 9/00456 |
| | | | | 382/232 |
| 2007/0242297 | A1 | 10/2007 | Eki | |

(Continued)

FOREIGN PATENT DOCUMENTS

| EP | 1 359 537 A2 | 11/2003 |
| JP | 10-285421 A | 10/1998 |

(Continued)

OTHER PUBLICATIONS

Extended European Search Report dated Jan. 30, 2015 in corresponding European Application No. 14184686.5.

*Primary Examiner* — Ted Barnes
(74) *Attorney, Agent, or Firm* — Nath, Goldberg & Meyer; Jerald L. Meyer; Stanley N. Protigal

(57) ABSTRACT

A printing control apparatus includes: an intermediate data generating unit that generates a piece of intermediate data; a judgment unit that, using attribute information, judges whether a piece of object data is a bitmap image; a first color/monochrome judgment unit that makes a color/monochrome judgment using the attribute information; and a second color/monochrome judgment unit that further makes the color/monochrome judgment for each individual pixel when the piece of object data is a bitmap image and is judged to be in color by the first color/monochrome judgment unit.

6 Claims, 14 Drawing Sheets

(56) References Cited

U.S. PATENT DOCUMENTS

| | | | | |
|---|---|---|---|---|
| 2007/0297672 A1* | 12/2007 | Eschbach | ............ | H04N 1/3871 382/173 |
| 2008/0292215 A1* | 11/2008 | Gaucas | ............ | G06K 9/3208 382/298 |
| 2009/0310149 A1* | 12/2009 | Kawasaki | ............ | H04N 1/6022 358/1.8 |
| 2011/0222085 A1* | 9/2011 | Takesue | ............ | H04N 1/3935 358/1.9 |
| 2013/0259373 A1* | 10/2013 | Ozawa | ............ | G06K 9/34 382/171 |
| 2015/0078657 A1* | 3/2015 | Nakao | ............ | G06K 9/4652 382/165 |

FOREIGN PATENT DOCUMENTS

| | | |
|---|---|---|
| JP | 2007-282027 A | 10/2007 |
| JP | 2009-42990 A | 2/2009 |
| JP | 2012-164358 A | 8/2012 |

* cited by examiner

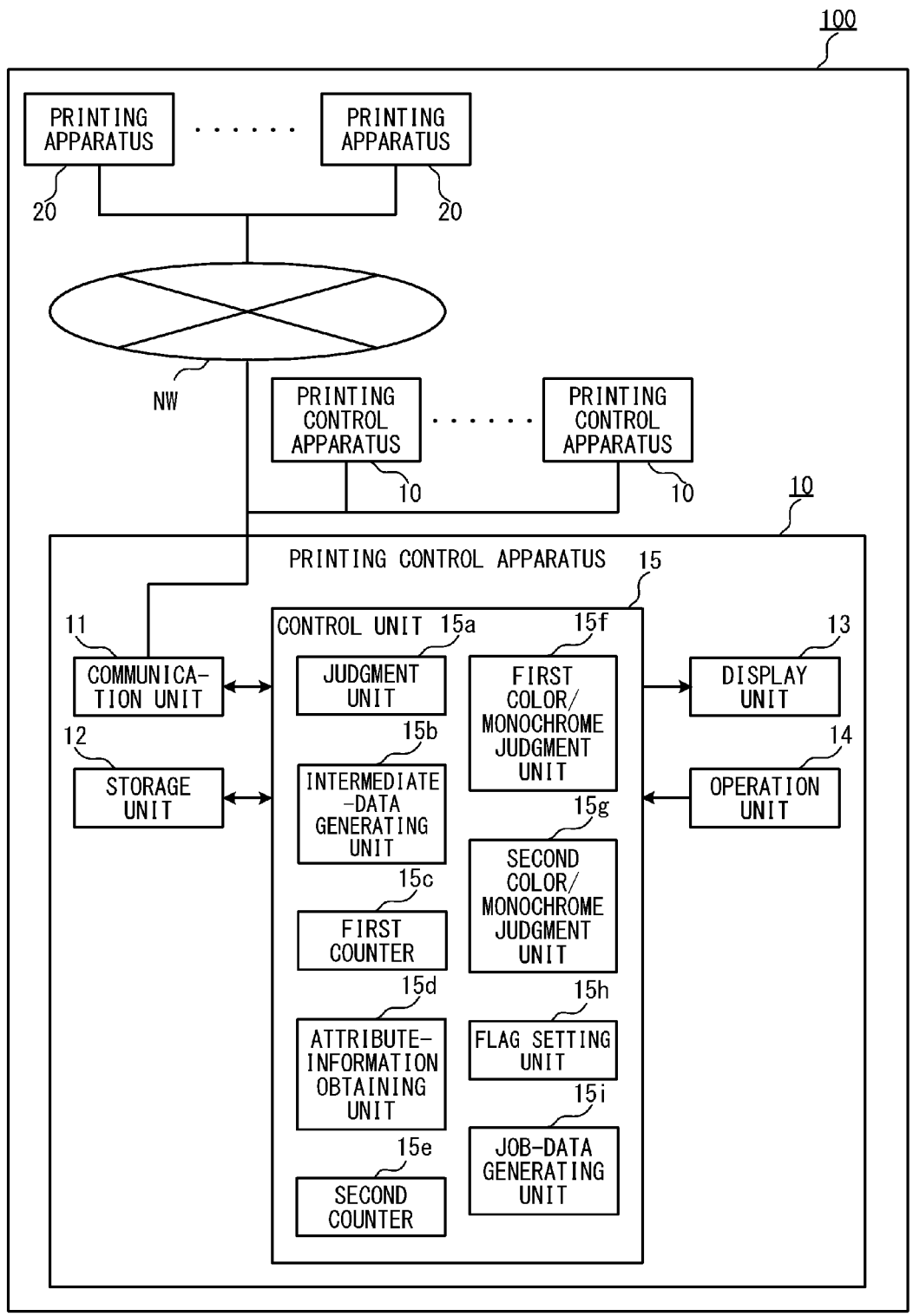
F I G. 1

FIG. 2A

| PAGE | COLOR FLAG |
|------|------------|
| PAGE 1 | 1 |
| PAGE 2 | 0 |
| PAGE 3 | 0 |
| ⋮ | ⋮ |

| VALUE OF biBitCount | MEANINGS |
|---------------------|----------|
| 1 | BLACK-AND-WHITE BITMAP |
| 4 | BITMAP CAN HOLD 16 COLORS AT MOST |
| 8 | BITMAP CAN HOLD 256 COLORS AT MOST |
| 16 | BITMAP CAN HOLD 65536 COLORS AT MOST |
| 24 | BITMAP CAN HOLD 16777216 COLORS AT MOST |
| 32 | BITMAP CAN HOLD 4294967296 COLORS AT MOST |

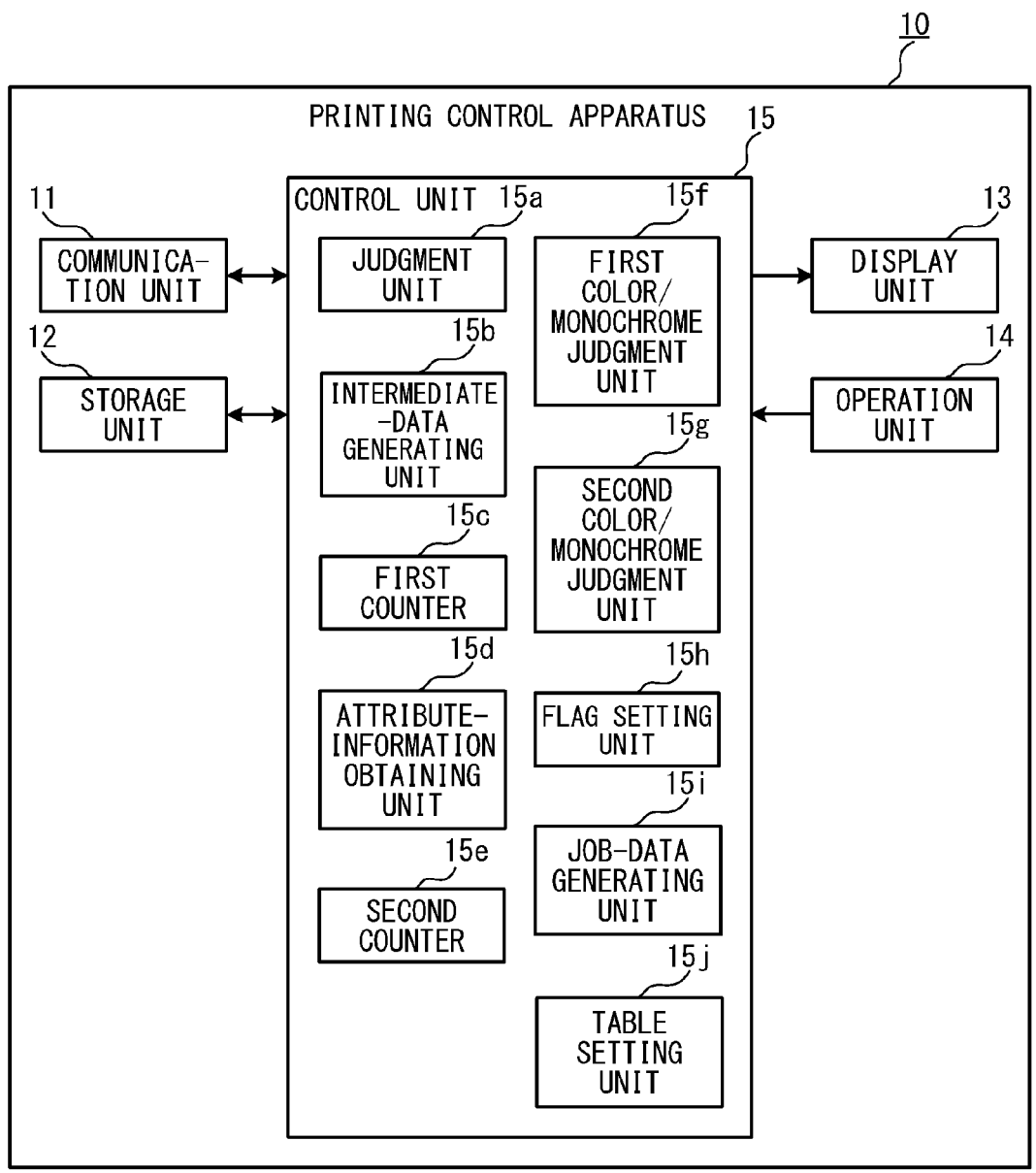
F I G. 5

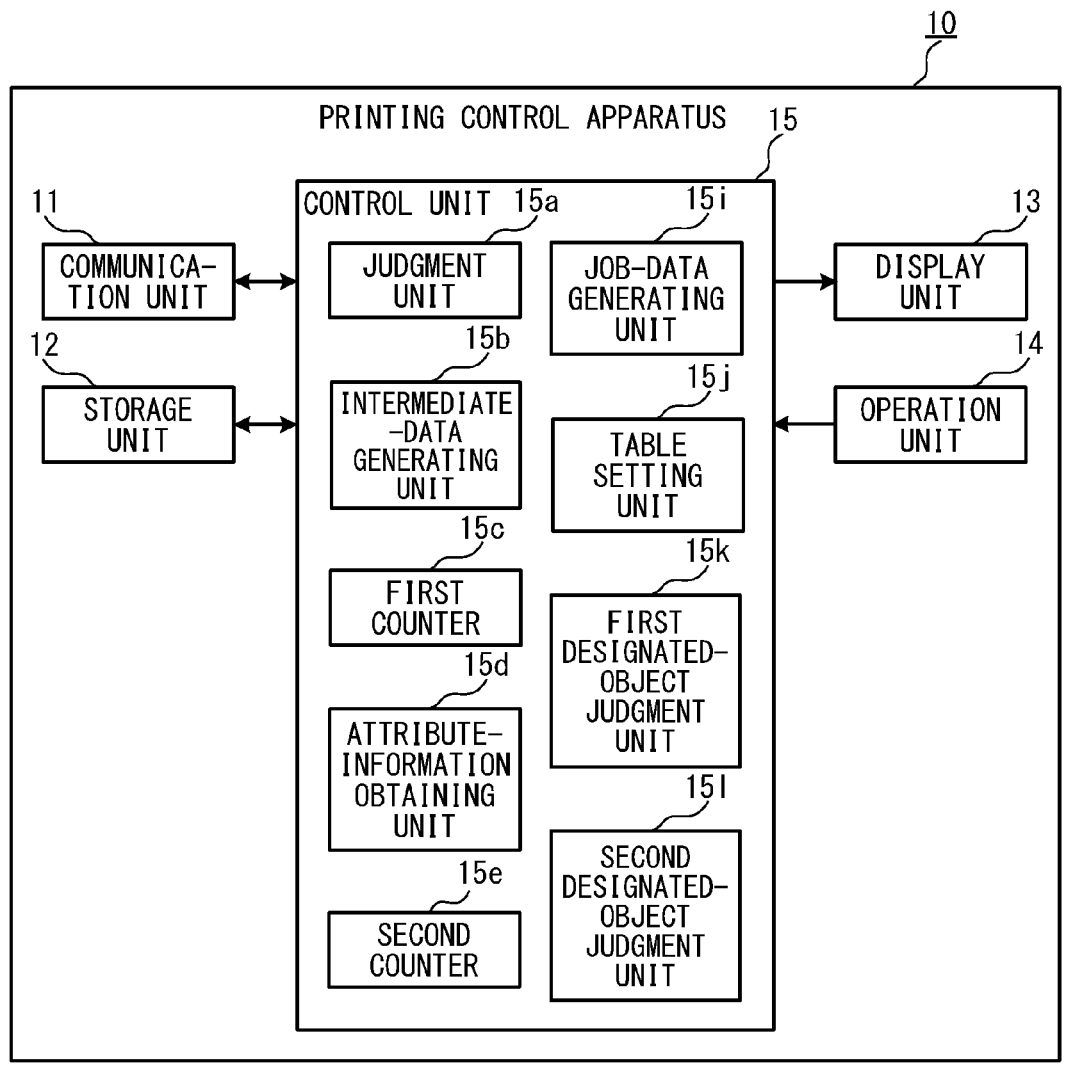
F I G. 1 0

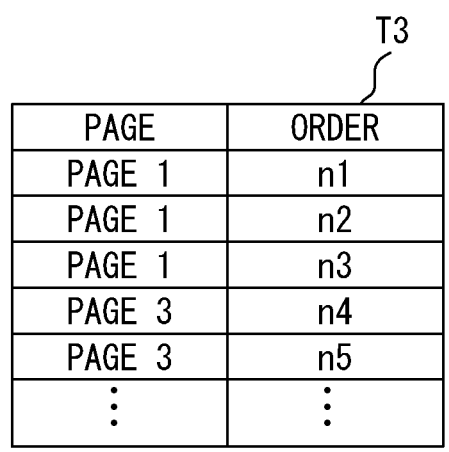
F I G. 1 2

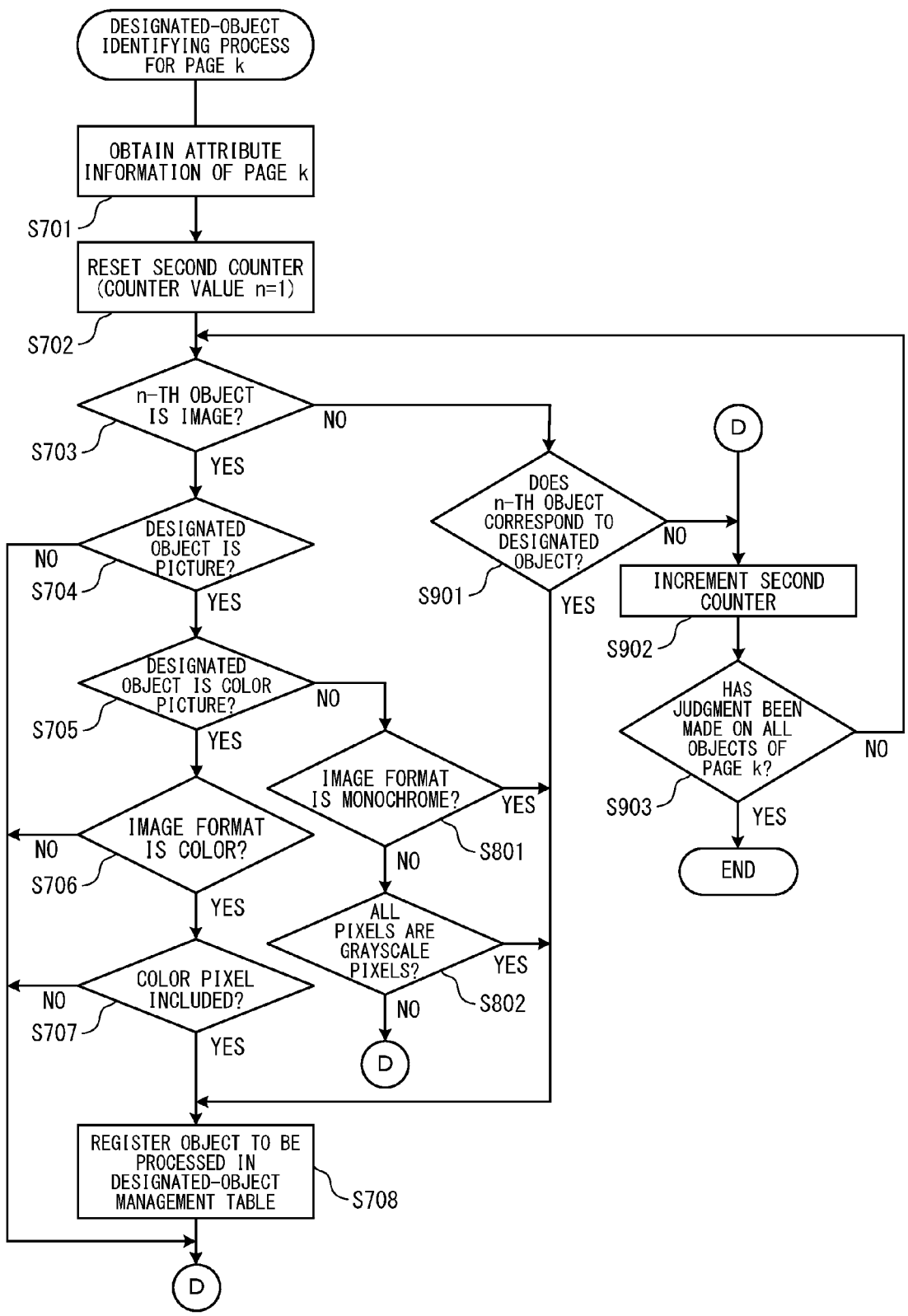
F I G. 14

PRINTING CONTROL APPARATUS THAT CONTROLS SWITCHING BETWEEN COLOR MODE AND MONOCHROME MODE

CROSS-REFERENCE TO RELATED APPLICATIONS

This application is based upon and claims the benefit of priority of the prior Japanese Patent Application No. 2013-194794, filed on Sep. 20, 2013, the entire contents of which are incorporated herein by reference.

FIELD

The present invention relates to a printing control apparatus.

BACKGROUND

In recent years, many printing apparatuses used in, for example, an office have had a function for switching between a color mode and a monochrome mode in accordance with the attributes of a print target page.

Some printing technologies have been proposed that relate to the function for switching between a color mode and a monochrome mode (e.g., patent document 1).

In the method proposed by patent document 1, a first color/monochrome judgment is performed using attribute information of object data. When the object data is an image, it is temporarily judged that the image is a color image without performing the first color/monochrome judgment. That is, even a monochrome image is judged to be a color image. When the object data is a monochrome image, color raster data is generated and a second color/monochrome judgment is then performed for each pixel.

Patent document 1: Japanese Laid-open Patent Publication No. 2007-282027

SUMMARY

In the method proposed in patent document 1, a color/monochrome judgment can be precisely performed for each page, but a long processing time is required because the color/monochrome judgment is performed on a pixel-by-pixel basis for every image.

In view of this problem, an object of the invention is to provide a printing control apparatus that is capable of making a color/monochrome judgment on all images without performing a color/monochrome judgment on a pixel-by-pixel basis, and to provide a recording medium having stored therein a program for enabling such a color/monochrome judgment.

A printing control apparatus of one aspect includes: a processor which performs a process including: generating, using a piece of data on a print target, a piece of intermediate data including a rendering command for each individual piece of object data; first judging, using attribute information of a piece of judgment-target object data included in the rendering command, whether the piece of judgment-target object data is a bitmap image; second judging, using the attribute information, which of color or monochrome the piece of judgment-target object data is in; third judging which of color or monochrome each individual pixel of the piece of judgment-target object data is in when the piece of judgment-target object data is a bitmap image and is judged to be in color by the second judging; and when the piece of judgment-target object data is judged to include a color pixel by third judging, generating a piece of job data indicating a color mode for a page of the print target on which the piece of judgment-target object data is placed.

According to a printing control apparatus of one aspect, when pieces of judgment-target object data are bitmap images, a first color/monochrome judgment is made using attribute information (format of the bitmap images), and a second color/monochrome judgment (color/monochrome judgment made on a pixel-by-pixel basis) is made on only a piece of object data judged to be in color in the first color/monochrome judgment.

Such a configuration may shorten the time required for the judgment process in comparison with a situation in which a color/monochrome judgment is made on a pixel-by-pixel basis for every image. That is, the processing speed can be enhanced. In addition, the first color/monochrome judgment is made, and then the second color/monochrome judgment is made on a pixel-by-pixel basis for bitmap images judged to be in color images in the first color/monochrome judgment, thereby achieving precise color/monochrome judgments. That is, an image consisting of only grayscale pixels can be judged to be a monochrome image.

A color/monochrome judgment is also made prior to conversion into raster data, i.e., a color/monochrome judgment is also made on a piece of intermediate data including a rendering command for each individual piece of object data. In, for example, a print preview mode, such a configuration enables a color or monochrome mode to be appropriately indicated for each page of a draft of a print preview target, thereby improving convenience. The color/monochrome judgment is made prior to conversion into raster data, and hence, for monochrome, only monochrome raster data needs to be generated, thereby decreasing the amount of memory to be used.

A printing control apparatus of another aspect includes: a processor which performs a process including: generating, using a piece of data on a print target, a piece of intermediate data including a rendering command for each individual piece of object data; first judging, using attribute information of a piece of judgment-target object data included in the rendering command, whether the piece of judgment-target object data is a bitmap image; when the piece of judgment-target object data is a bitmap image, second judging, using the attribute information, whether the piece of judgment-target object data is in color, so as to judge whether the piece of judgment-target object data corresponds to a designated object indicating a type of object data including a color element, the designated object is designated in a print setting; when a judgment-target bitmap image is judged to be in color by the second judging, third judging which of color or monochrome each individual pixel of the judgment-target bitmap image is in, so as to judge whether the piece of judgment-target object data corresponds to the designated object; and generating a piece of job data for applying a predetermined process to a piece of object data judged to correspond to the designated object by the third judging.

A printing control apparatus of another aspect, for example, generates a piece of job data from which a piece of object data corresponding to a designated object has been excluded. Such a configuration allows a plurality of types of job data to be generated using one draft so that user convenience can be improved.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a functional block diagram illustrating an exemplary configuration of a print system in accordance with embodiment 1 and an exemplary configuration of a printing control apparatus forming the print system.

FIG. 2A illustrates an exemplary color/monochrome management table in accordance with embodiment 1.

FIG. 2B illustrates a method for a color/monochrome judgment in accordance with embodiment 1 under a condition in which judgment-target object data is a bitmap image.

FIG. 5 is a functional block diagram illustrating an exemplary configuration of a printing control apparatus forming a print system in accordance with embodiment 2.

FIG. 10 is a functional block diagram illustrating an exemplary configuration of a printing control apparatus forming a print system in accordance with embodiment 4.

FIG. 12 illustrates an example of a designated-object management table in accordance with embodiment 4.

FIG. 14 is an exemplary flowchart illustrating the flow of a designated-object identifying process for page k in accordance with embodiment 4.

DESCRIPTION OF EMBODIMENTS

Figure 3:
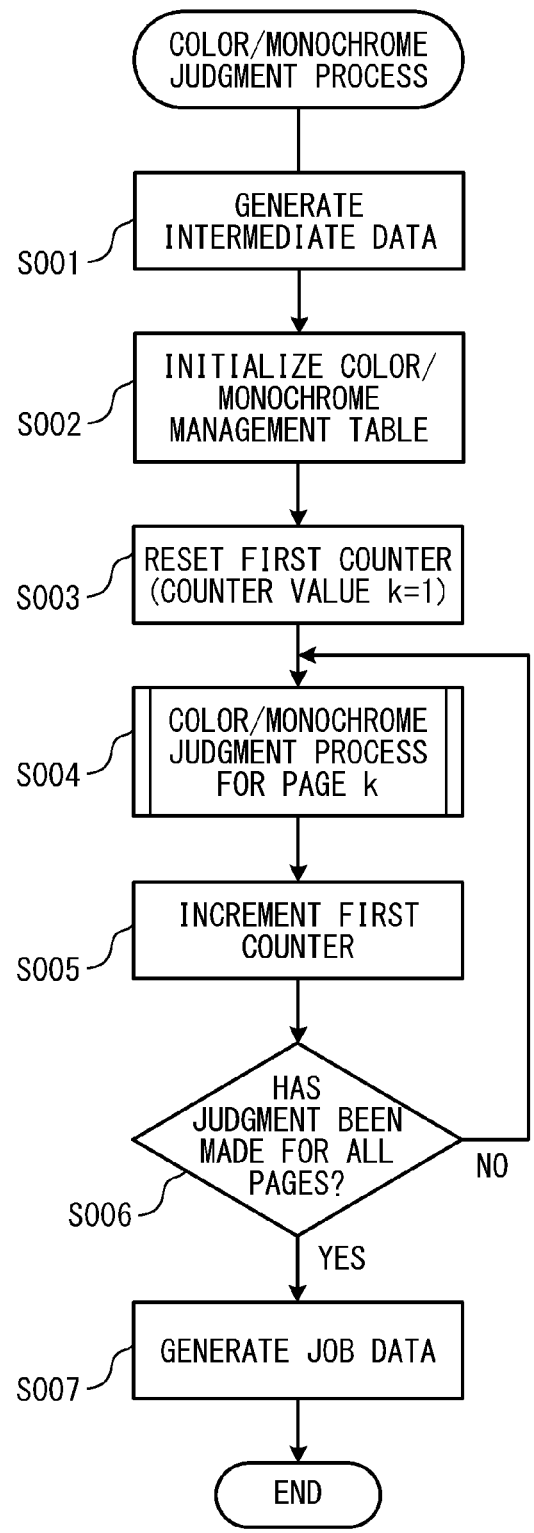
FIG. 3 is an exemplary flowchart illustrating the flow of a color/monochrome judgment process in accordance with embodiment 1.

The following will describe embodiments of the present invention in detail with reference to the drawings.

Descriptions will be given of embodiment 1.

FIG. 1 is a functional block diagram illustrating an exemplary configuration of a print system 100 in accordance with embodiment 1 and an exemplary configuration of a printing control apparatus 10 forming the print system 100. As depicted in FIG. 1, the print system 100 includes one or more printing control apparatuses 10 and one or more printing apparatuses 20 (image forming apparatuses), and the printing control apparatuses 10 and the printing apparatuses 20 are communicably connected over a network NW.

The printing apparatus 20 processes a print job (hereinafter referred to as job data) output by the printing control apparatus 10, prints information on a print medium such as printing paper, and outputs the print medium.

The printing control apparatus 10 in accordance with embodiment 1, which is an information terminal apparatus, e.g., a smartphone or PC (Personal Computer), generates job data for a print target in accordance with a print instruction from a user and transmits the generated job data to a designated printing apparatus 20. As depicted in FIG. 1, the printing control apparatus 10 in accordance with embodiment 1 includes a communication unit 11, a storage unit 12, a display unit 13, an operation unit 14, and a control unit 15.

The following descriptions are based on an example in which an OS (Operating System) of the printing control apparatus 10 is Windows®.

The communication unit 11 consists of, for example, a communication module and communicates with the printing apparatus 20 over the network NW. In one possible example, the communication unit 11 transmits generated job data to the printing apparatus 20.

The storage unit 12 consists of, for example, a RAM (Random Access Memory), a ROM (Read Only Memory), and an HDD (Hard Disk Drive) and functions as a work area for a CPU (Central Processing Unit) forming the control unit 15; a program area for storing various programs such as an operation program for controlling the entirety of the printing control apparatus 10; and a data area for storing various types of data such as a color/monochrome management table T1, which will be described in detail hereinafter.

Next, with reference to FIG. 2A, descriptions will be given of a color/monochrome management table T1 stored in the data area of the storage unit 12. FIG. 2A illustrates an example of a color/monochrome management table T1 in accordance with embodiment 1.

The color/monochrome management table T1 is managed by a flag setting unit 15$h$, which will be described in detail hereinafter. In the generating of job data, a job data generating unit 15$i$, which will be described in detail hereinafter, refers to the color/monochrome management table T1. As depicted in FIG. 2A, each "color flag" is associated with a "page" in the color/monochrome management table T1.

A "color flag" indicates whether the corresponding page includes color object data. In embodiment 1, a flag value of "0" indicates that the corresponding page does not include color object data, and a flag value of "1" indicates that the corresponding page does include color object data. "0" is given as an initial value. When color object data is included, the flag setting unit 15$h$ changes a corresponding flag value to "1".

In the example of FIG. 2A, the flag value corresponding to page 1 is "1", and this means that page 1 has been judged to include color object data.

Descriptions will be given by referring to FIG. 1 again. The display unit 13 consists of a display apparatus, e.g., an LCD (Liquid Crystal Display) or an organic EL (Electro-Luminescence) display. The display unit 13 displays, for example, various feature buttons and various setting screens on the display screen.

The operation unit 14 consists of, for example, a keyboard and/or a touch panel displayed on the display screen of the display unit 13. The user can operate the operation unit 14 to give an instruction to perform a desired process, e.g., give a print instruction.

The control unit 15 consists of, for example, a CPU. The control unit 15 executes an operation program stored in a program area of the storage unit 12 so as to achieve, as depicted in FIG. 1, functions as a judgment unit 15$a$, an intermediate-data generating unit 15$b$, a first counter 15$c$, an attribute-information obtaining unit 15d, a second counter 15e, a first color/monochrome judgment unit 15f, a second color/monochrome judgment unit 15g, a flag setting unit 15h, and a job-data generating unit 15i, and so as to perform various processes, including a color/monochrome judgment process and a process of controlling the entirety of the printing control apparatus 10.

The judgment unit 15a judges whether a color/monochrome judgment has been made on all print-target pages. More particularly, the judgment unit 15a judges whether a counter value k of the first counter 15c has exceeded the number of print-target pages, so as to judge whether the color/monochrome judgment has been made on all print-target pages.

The judgment unit 15a judges whether an n-th piece of object data corresponding to the counter value n of the second counter 15e is a bitmap image such as an image in JPEG (Joint Photographic Experts Group) format or image in GIF (Graphics Interchange Format). More particularly, the judgment unit 15a analyzes attribute information of judgment-target object data obtained by the attribute-information obtaining unit 15d and judges, using, for example, a file type, whether the object data is a bitmap image.

The judgment unit 15a judges whether the color/monochrome judgment has been made on all of the pieces of object data of a judgment-target page. More particularly, the judgment unit 15a judges whether a counter value n of the second counter 15e has exceeded the number of pieces of the object data of the print-target page, so as to decide whether the color/monochrome judgment has been made on all of the pieces of object data of the print-target page.

In response to a print instruction from the user, using print-target data, the intermediate-data generating unit 15b generates an EMF (Enhanced Meta File) for causing a process to be performed for generating job data in a background and stores the EMF in the storage unit 12. The EMF is intermediate data including a rendering command for each individual piece of object data. Using the EMF, the job-data generating unit 15i can generate job data in the background. The EMF will hereinafter be referred to as intermediate data.

The first counter 15c is a counter for making a management to decide whether the color/monochrome judgment has been made on all of the print-target pages. The control unit 15 manages the first counter 15c. In embodiment 1, the initial value of the counter value k of the first counter 15c is "1", which is incremented by the control unit 15 every time the color/monochrome judgment is made on one page. That is, the counter value k of the first counter 15c indicates the number of a judgment-target page. Judgment-target pages will hereinafter be referred to as "page k".

The attribute-information obtaining unit 15d analyzes intermediate data generated by the intermediate-data generating unit 15b so as to obtain attribute information of each piece of object data of the page k. That is, for each piece of object data, the attribute-information obtaining unit 15d obtains the attribute information included in a corresponding rendering command.

The attribute information of object data obtained by the attribute-information obtaining unit 15d includes, for example, the file type of the object data; for object data that is not a bitmap image, the attribute information includes the color code of the object data; for object data that is a bitmap image, the attribute information includes the format of the bitmap image.

The second counter 15e is a counter for making a management to judge whether the color/monochrome judgment has been made on all pieces of object data of the page k in a color/monochrome judgment process performed on a page-by-page basis. The control unit 15 manages the second counter 15e. In embodiment 1, the initial value of the counter value n of the second counter 15e is "1", which is incremented by the control unit 15 every time a piece of judgment-target object data is judged to be in monochrome in the color/monochrome judgment process intended for each individual piece of object data.

In embodiment 1, in the color/monochrome judgment performed for each individual piece of object data, the color/monochrome judgment process is performed on pieces of object data starting from the upper end of the page k toward the lower end thereof. That is, the counter value n of the second counter 15e indicates a piece of judgment-target object data of the page k, wherein the counter value n becomes lower to indicate a piece of judgment-target object data closer to the upper end, and becomes higher to indicate a piece of judgment-target object data closer to the bottom end.

Using the attribute information of judgment-target object data obtained by the attribute-information obtaining unit 15d, the first color/monochrome judgment unit 15f decides which of color or monochrome the judgment-target object data is in.

More particularly, when the judgment-target object data is not a bitmap image, the first color/monochrome judgment unit 15f makes the color/monochrome judgment using a color code included in the rendering command of the judgment-target object data.

As an example, the color code 0xFF008000 represents ($\alpha$, R, G, B)=(255, 0, 128, 0), which indicates rendering with a color in the green range. That is, the object data in such a case is judged to be in color by the first color/monochrome judgment unit 15f. In other words, when a color code indicates grayscale or black and white, the first color/monochrome judgment unit 15f judges the object data to be in monochrome; otherwise, the first color/monochrome judgment unit 15f judges the object data to be in color. Note that $\alpha$, R, G, and B mean transmittance, red, green, and blue, respectively.

For judgment-target object data that is a bitmap image, the first color/monochrome judgment unit 15f makes the color/monochrome judgment using the format of the bitmap image. That is, the first color/monochrome judgment unit 15f makes the color/monochrome judgment using a value (biBitCount) specifying the number of bits per pixel in the format of the bitmap image.

With reference to FIG. 2B, the following will more specifically describe the method for the color/monochrome judgment of embodiment 1 under a condition in which judgment-target object data is a bitmap image. FIG. 2B illustrates a method for a color/monochrome judgment in accordance with embodiment 1 under a condition in which judgment-target object data is a bitmap image.

Referring to FIG. 2B, '1' indicates a black-and-white bitmap, according to which the first color/monochrome judgment unit 15f judges the judgment-target object data to be in monochrome. "4", "8", "16", "24", and "32" respectively mean that the maximum numbers of colors that can be held (hereinafter referred to as "maximum holdable-colors number") are 16 ($2^4$), 256 ($2^8$), 65536 ($2^{16}$), 16777216 ($2^{24}$), and 4294967296 ($2^{32}$); in the case of these values, accordingly, the first color/monochrome judgment unit 15f judges the judgment-target object data to be in color.

Descriptions will be given with reference to FIG. 1 again. When judgment-target object data is a bitmap image judged to be in color by the first color/monochrome judgment unit

15$f$, the second color/monochrome judgment unit 15$g$ makes the color/monochrome judgment for each of the pixels of the judgment-target object data in order starting from, for example, a pixel at the upper-left end. In this case, when a certain pixel is judged to be in color, the second color/monochrome judgment unit 15$g$ does not perform the color/monochrome judgment on the following pixels and judges that the judgment-target object data is in color.

Even in a situation where the first color/monochrome judgment unit 15$f$ makes the color/monochrome judgment, when the value specifying the number of bits per pixel is "4", "8", "16", "24", or "32", the second color/monochrome judgment unit 15$g$ also makes the color/monochrome judgment for each pixel because all of the pixels of the judgment-target object data could be in R=G=B (grayscale).

The flag setting unit 15$h$ initializes the color/monochrome management table T1 and changes the settings of color flags therein. More particularly, when judgment-target object data is not a bitmap image and the first color/monochrome judgment unit 15$f$ or the second color/monochrome judgment unit 15$g$ judges the judgment-target object data to be in color, the flag setting unit 15$h$ changes the flag value of the color flag of a corresponding page within the color/monochrome management table T1, i.e., a page on which the judgment-target object data is located, to "1". Accordingly, job data is generated indicating the color mode for the page.

When the color/monochrome judgment has been completed on all of the print-target pages, the job-data generating unit 15$i$ refers to the color/monochrome management table T1 so as to generate job data reflecting the result of the color/monochrome judgment, and causes the communication unit 11 to transmit the generated job data to a designated printing apparatus 20. Referring to, for example, FIG. 2A, the job-data generating unit 15$i$ generates job data indicating the color mode for page 1 and the monochrome mode for pages 2 and 3.

With reference to FIG. 3, the following will describe the flow of a color/monochrome judgment process performed by the printing control apparatus 10 in accordance with embodiment 1. FIG. 3 is an exemplary flowchart illustrating the flow of a color/monochrome judgment process in accordance with embodiment 1. The color/monochrome judgment process starts in response to a print instruction made by the user operating the operation unit 14.

The print instruction is made to cause the intermediate-data generating unit 15$b$ to generate intermediate data using print-target data and to store the intermediate data in the storage unit 12 (step S001). The flag setting unit 15$h$ initializes the color/monochrome management table T1 (step S002). The control unit 15 resets the first counter 15$c$ (counter value k=1) (step S003).

The first color/monochrome judgment unit 15$f$ performs the color/monochrome judgment process for a page k in cooperation with, for example, the attribute-information obtaining unit 15$d$ (step S004). When the color/monochrome judgment process for the page k ends, the control unit 15 increments the first counter 15$c$ (step S005), and the judgment unit 15$a$ judges whether the color/monochrome judgment has been made on all of the pages of the print target (step S006).

When the judgment unit 15$a$ judges that the color/monochrome judgment has not been made for all of the pages of the print target (NO in step S006), the flow returns to step S004, and the aforementioned processes are repeated.

Meanwhile, when the judgment unit 15$a$ judges that the color/monochrome judgment has been made on all of the pages of the print target (YES in step S006), the job-data generating unit 15$i$ refers to the color/monochrome management table T1 so as to generate job data reflecting the result of the color/monochrome judgment on the print target, and causes the communication unit 11 to transmit the generated job data to a designated printing apparatus 20 (step S007). Then, the process ends.

Figure 4:
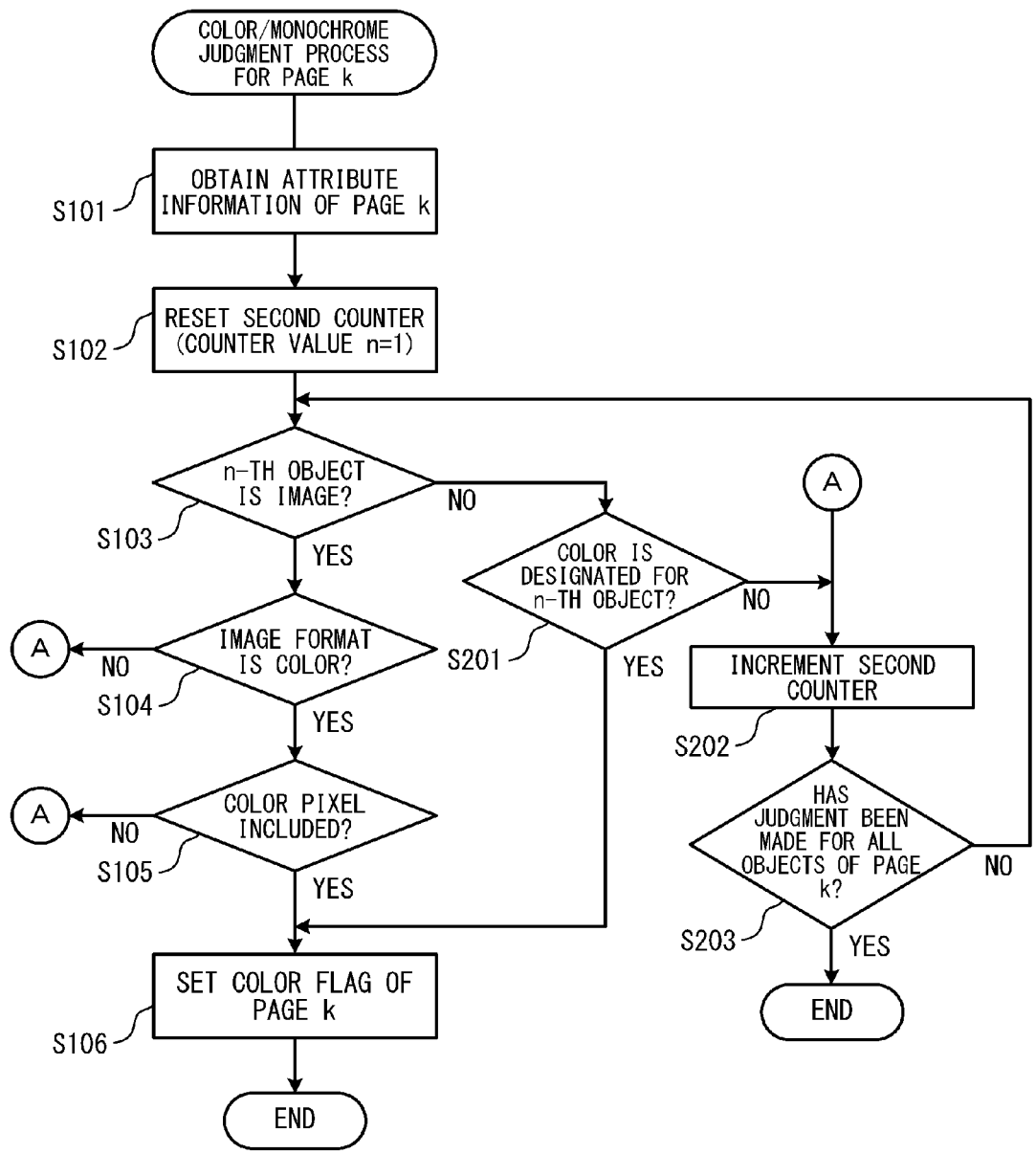
FIG. 4 is an exemplary flowchart illustrating the flow of a color/monochrome judgment process for a page k in accordance with embodiment 1.

With reference to FIG. 4, the following will describe the flow of a color/monochrome judgment process for a page k in accordance with embodiment 1. FIG. 4 is an exemplary flowchart illustrating the flow of a color/monochrome judgment process for a page k in accordance with embodiment 1. This color/monochrome judgment process for a page k corresponds to the process of step S004 of the aforementioned color/monochrome judgment process.

The attribute-information obtaining unit 15$d$ analyzes intermediate data so as to obtain attribute information of each piece of object data of the page k (step S101). The control unit 15 resets the second counter 15$e$ (counter value n=1) (step S102).

The judgment unit 15$a$ judges whether an n-th piece of object data of the page k is a bitmap image (step S103).

When the judgment unit 15$a$ judges that the n-th piece of object data is a bitmap image (YES in step S103), the first color/monochrome judgment unit 15$f$ makes the color/monochrome judgment using the format of the bitmap image (step S104).

When the result of the judgment made by the first color/monochrome judgment unit 15$f$ is monochrome (NO in step S104), the flow shifts to step S202, which will be described hereinafter. Meanwhile, when the result of the judgment made by the first color/monochrome judgment unit 15$f$ is color (YES in step S104), the second color/monochrome judgment unit 15$g$ makes the color/monochrome judgment for each pixel of the judgment-target object data (step S105).

When the second color/monochrome judgment unit 15$g$ judges that the judgment-target object data does not include a color pixel (NO in step S105), the flow shifts to step S202, which will be described hereinafter.

Meanwhile, when the second color/monochrome judgment unit 15$g$ judges that the judgment-target object data includes a color pixel (YES in step S105), the flag setting unit 15$h$ changes the flag value of the color flag of the page k to "1" (step S106). Then, the process ends, and the flow shifts to step S005 in the color/monochrome judgment process.

As described above, when the second color/monochrome judgment unit 15$g$ judges that the judgment-target object data includes a color pixel, the color/monochrome judgment is not made on all pieces of object data of the page k, and the color/monochrome judgment on the page k immediately terminates.

When the judgment unit 15$a$ judges in step S103 that the n-th piece of object data is not a bitmap image (NO in step S103), the first color/monochrome judgment unit 15$f$ makes the color/monochrome judgment using color codes (step S201).

When the result of the judgment made by the first color/monochrome judgment unit 15$f$ is color (YES in step S201), the flow shifts to step S106, where the flag setting unit 15$h$ changes the flag value of the color flag of the page k to "1" (step S106). Then, the process ends, and the flow shifts to step S005 in the color/monochrome judgment process.

As described above, when judgment-target object data that is not a bitmap image is judged to be in color by the first color/monochrome judgment unit 15$f$, the color/monochrome judgment is not made on all of the pieces of object data of the page k, and the color/monochrome judgment on the page k immediately terminates.

Meanwhile, when the result of the judgment made by the first color/monochrome judgment unit 15f is monochrome (NO in step S201), the control unit 15 increments the second counter 15e (step S202), and the judgment unit 15a judges whether the color/monochrome judgment has been made on all of the pieces of object data of the page k (step S203).

When the judgment unit 15a judges that the color/monochrome judgment has not been made on all of the pieces of object data of the page k (NO in step S203), the flow returns to step S103, and the aforementioned processes are repeated.

Meanwhile, when the judgment unit 15a judges that the color/monochrome judgment has been made on all of the pieces of object data of the page k (YES in step S203), the process ends, and the flow shifts to step S005 in the color/monochrome judgment process. In this case, the flag value of the color flag of the page k registered in the color/monochrome management table T1 does not change.

In embodiment 1, for judgment-target object data that is a bitmap image, the printing control apparatus 10 initially makes the first color/monochrome judgment process using an image format and performs the second color/monochrome judgment process (a color/monochrome judgment made for each individual pixel) for only those pieces of object data judged to be in color in the first color/monochrome judgment.

Such a configuration may shorten the time required for the judgment process in comparison with a situation in which a color/monochrome judgment is made on a pixel-by-pixel basis for every image. That is, the processing speed can be enhanced. In addition, the first color/monochrome judgment is made, and then the second color/monochrome judgment is made on a pixel-by-pixel basis for object data (a bitmap image) judged to be color data in the first color/monochrome judgment, thereby achieving precise color/monochrome judgments. That is, an image consisting of only grayscale pixels can be judged to be a monochrome image.

In embodiment 1, the printing control apparatus 10 makes the color/monochrome judgment on a page-by-page basis before converting intermediate data generated by the intermediate-data generating unit 15b into raster data, i.e., the printing control apparatus 10 makes the color/monochrome judgment on a page-by-page basis for intermediate data including a rendering command for each individual piece of object data.

In, for example, a print preview mode, such a configuration enables a color or monochrome mode to be appropriately indicated for each page of a draft of a print preview target, thereby improving convenience. The color/monochrome judgment is made on a page-by-page basis prior to conversion into raster data, and hence, for a monochrome image, only monochrome raster data needs to be generated, thereby decreasing the amount of memory to be used.

The following will describe embodiment 2.

In embodiment 1, in the color/monochrome judgment intended for each individual piece of object data, the color/monochrome judgment is made on pieces of object data starting from the upper end of the page k toward the lower end thereof.

In embodiment 2, a color/monochrome judgment intended for a bitmap image is initially performed. This is because bitmap images are far more likely to be color images than non-bitmap-image object data are. Hence, initially performing the color/monochrome judgment intended for a bitmap image may shorten the processing time required to make the judgment.

FIG. 5 is a functional block diagram illustrating an exemplary configuration of the printing control apparatus 10, which forms the print system 100 in accordance with embodiment 2. The configuration of the print system 100 of embodiment 2 is the same as the print system 100 of embodiment 1. The basic configuration of the printing control apparatus 10 in accordance with embodiment 2 is the same as the printing control apparatus 10 in accordance with embodiment 1.

Figure 6:
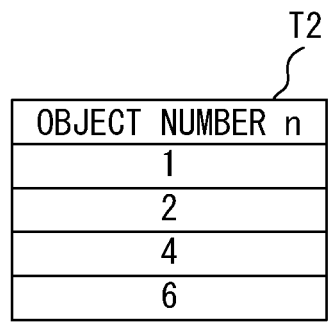
FIG. 6 illustrates an exemplary unprocessed object management table in accordance with embodiment 2.

However, as illustrated in FIG. 5, embodiment 2 is different from embodiment 1 in the sense that the control unit further includes a table setting unit 15j. Another difference from embodiment 1 is that the storage unit 12 further stores an unprocessed object management table T2, which is depicted in FIG. 6. In addition, the judgment unit 15a and the second counter 15e provide functions slightly different from those provided by the judgment unit 15a and the second counter 15e in embodiment 1.

First, with reference to FIG. 6, descriptions will be given of the unprocessed object management table T2, which is stored in the storage unit 12. FIG. 6 illustrates an example of the unprocessed object management table T2 in accordance with embodiment 2. The unprocessed object management table T2 is managed by the table setting unit 15j and includes a list of object numbers n.

The table setting unit 15j stores, in the fields of "object number n", counter values n of the second counter 15e that correspond to pieces of non-bitmap-image object data from among the pieces of object data of a page k. That is, the unprocessed object management table T2 is a table for managing non-bitmap-image object data, i.e., data to be dealt with after the color/monochrome judgment is performed preferentially on a bitmap image. Referring to, for example, FIG. 6, "1", "2", "4", and "6" are registered, indicating that none of the pieces of object data corresponding to "1", "2", "4", and "6", i.e., counter values n of the second counter 15e, is a bitmap image.

Descriptions will be given with reference to FIG. 5 again. The control unit 15 consists of, for example, a CPU. The control unit 15 executes an operation program stored in a program area of the storage unit 12 so as to achieve, as depicted in FIG. 5, functions as the judgment unit 15a, the intermediate-data generating unit 15b, the first counter 15c, the attribute-information obtaining unit 15d, the second counter 15e, the first color/monochrome judgment unit 15f, the second color/monochrome judgment unit 15g, the flag setting unit 15h, the job-data generating unit 15i, and the table setting unit 15j, and so as to perform various processes, including a color/monochrome judgment process and a process of controlling the entirety of the printing control apparatus 10.

The judgment unit 15a judges whether the color/monochrome judgment has been made on all print-target pages. More particularly, the judgment unit 15a judges whether a counter value k of the first counter 15c has exceeded the number of print-target pages, so as to judge whether the color/monochrome judgment has been made on all print-target pages.

The judgment unit 15a judges whether an n-th piece of object data corresponding to the counter value n of the second counter 15e is a bitmap image. More particularly, the judgment unit 15a analyzes attribute information of judgment-target object data obtained by the attribute-information obtaining unit 15d and judges, using, for example, a file type, whether the object data is a bitmap image.

The judgment unit 15a judges whether all pieces of object data of a page k have been judged as to whether they are bitmap images. More particularly, the judgment unit 15*a* judges whether a counter value n of the second counter 15*e* has exceeded the number of pieces of the object data of the page k, so as to judge whether all pieces of object data of the page k have been judged as to whether they are bitmap images.

In addition, the judgment unit 15*a* refers to the unprocessed object management table T2 so as to judge whether an object number is registered.

The second counter 15*e* is a counter for making a management to judge whether, in the color/monochrome judgment process performed on a page-by-page basis, all pieces of object data of the page k have been judged as to whether they are bitmap images. The control unit 15 manages the second counter 15*e*. In embodiment 2, the initial value of the counter value n of the second counter 15*e* is "1", which is incremented by the control unit 15 every time a piece of object data is judged as to whether it is a bitmap image in the color/monochrome judgment process performed for each individual piece of object data.

In embodiment 2, in the color/monochrome judgment performed for each individual piece of object data, each piece of object data is judged as to whether it is a bitmap image, starting from the upper end of the page k toward the lower end thereof. That is, the counter value n of the second counter 15*e* indicates a piece of judgment-target object data of the page k, wherein the counter value n becomes lower to indicate a piece of judgment-target object data closer to the upper end, and becomes higher to indicate a piece of judgment-target object data closer to the bottom end.

The table setting unit 15*j* manages the unprocessed object management table T2. In one possible example, when the judgment unit 15*a* judges that a piece of object data is not a bitmap image, the table setting unit 15*j* registers the counter value n of the second counter 15*e* in the unprocessed object management table T2. In another possible example, when the first color/monochrome judgment unit 15*f* performs the color/monochrome judgment process on a piece of object data registered in the unprocessed object management table T2, the table setting unit 15*j* deletes the registration of this piece of object data from the unprocessed object management table T2.

Figure 7:
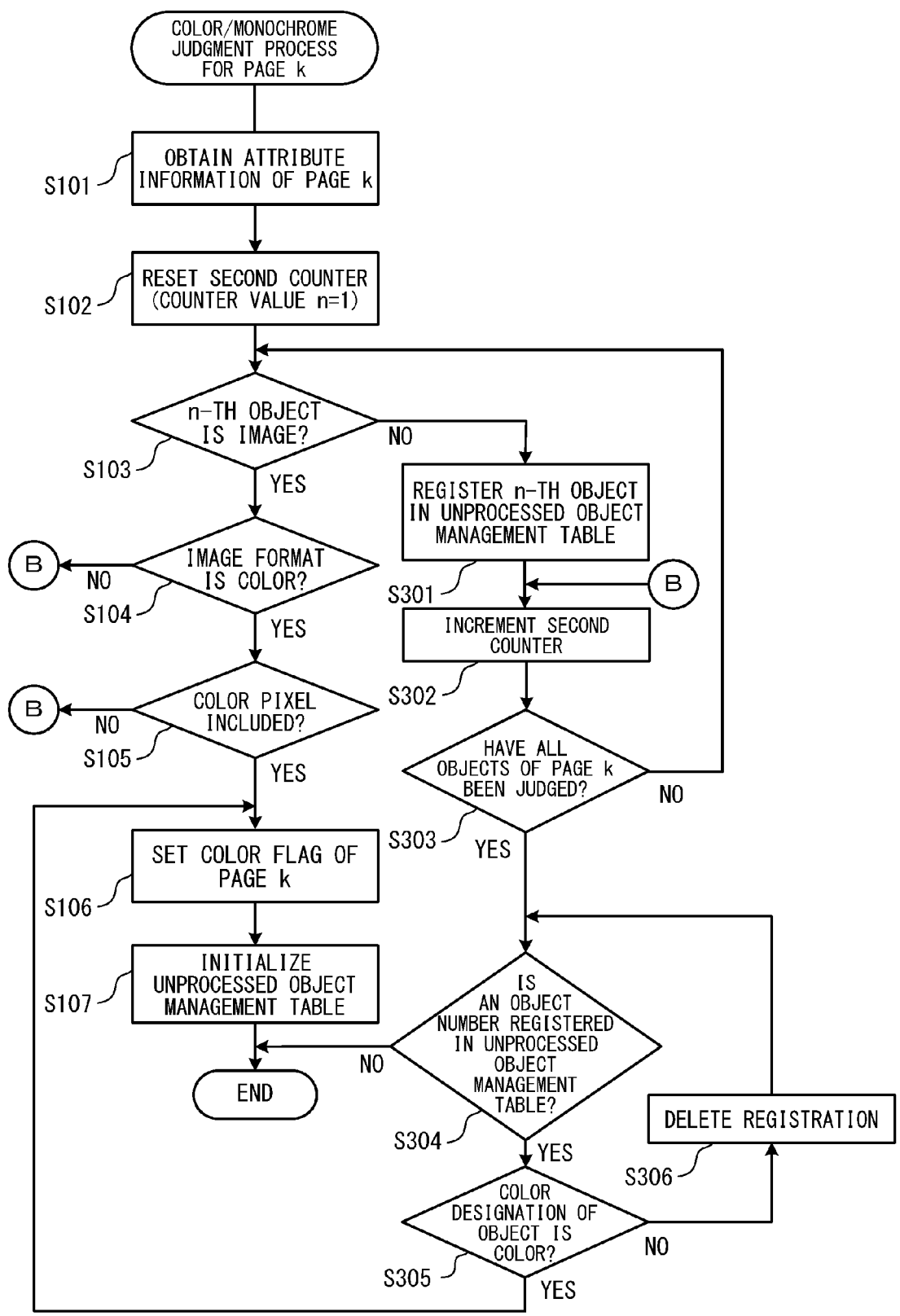
FIG. 7 is an exemplary flowchart illustrating the flow of a color/monochrome judgment process for a page k in accordance with embodiment 2.

With reference to FIG. 7, the following will describe the flow of the color/monochrome judgment process for a page k in accordance with embodiment 2. FIG. 7 is an exemplary flowchart illustrating the flow of the color/monochrome judgment process for a page k in accordance with embodiment 2. This color/monochrome judgment process for a page k corresponds to the process of step S004 of the aforementioned color/monochrome judgment process. Note that the color/monochrome judgment process in accordance with embodiment 2 is the same as the color/monochrome judgment process in accordance with embodiment 1.

The attribute-information obtaining unit 15*d* analyzes intermediate data so as to obtain attribute information of each piece of object data of the page k (step S101). The control unit 15 resets the second counter 15*e* (counter value n=1) (step S102).

The judgment unit 15*a* judges whether an n-th piece of object data of the page k is a bitmap image (step S103).

When the judgment unit 15*a* judges that the n-th piece of object data is a bitmap image (YES in step S103), the first color/monochrome judgment unit 15*f* makes the color/monochrome judgment using the format of the bitmap image (step S104).

When the result of the judgment made by the first color/monochrome judgment unit 15*f* is monochrome (NO in step S104), the flow shifts to step S302, which will be described hereinafter. Meanwhile, when the result of the judgment made by the first color/monochrome judgment unit 15*f* is color (YES in step S104), the second color/monochrome judgment unit 15*g* makes the color/monochrome judgment for each pixel of the judgment-target object data (step S105).

When the second color/monochrome judgment unit 15*g* judges that the judgment-target object data does not include a color pixel (NO in step S105), the flow shifts to step S302, which will be described hereinafter.

Meanwhile, when the second color/monochrome judgment unit 15*g* judges that the judgment-target object data includes a color pixel (YES in step S105), the flag setting unit 15*h* changes the flag value of the color flag of the page k to "1" (step S106).

The table setting unit 15*j* initializes the unprocessed object management table T2 (step S107). Then, the subject process ends, and the flow shifts to step S005 in the color/monochrome judgment process. As described above, when the second color/monochrome judgment unit 15*g* judges that the judgment-target object data includes a color pixel, the color/monochrome judgment is not made on all pieces of object data of the page k, and the color/monochrome judgment on the page k immediately terminates.

When the judgment unit 15*a* judges in step S103 that the n-th piece of object data is not a bitmap image (NO in step S103), the table setting unit 15*j* registers the counter value n of the second counter 15*e* in the unprocessed object management table T2 (step S301).

The control unit 15 increments the second counter 15*e* (step S302). The judgment unit 15*a* judges whether all pieces of object data of the page k have been judged as to whether they are bitmap images (step S303). When the judgment unit 15*a* judges that not every piece of object data of the page k has been judged as to whether it is a bitmap image (NO in step S303), the flow returns to step S103, and the aforementioned processes are repeated.

Meanwhile, when the judgment unit 15*a* judges that every piece of object data of the page k has been judged as to whether it is a bitmap image (YES in step S303), the judgment unit 15*a* further judges whether an object number is registered in the unprocessed object management table T2 (step S304).

When the judgment unit 15*a* judges that an object number is not registered in the unprocessed object management table T2 (NO in step S304), the process ends, and the flow shifts to step S005 in the color/monochrome judgment process. In this case, the flag value of the color flag of the page k registered in the color/monochrome management table T1 does not change.

Meanwhile, when the judgment unit 15*a* judges that an object number is registered in the unprocessed object management table T2 (YES in step S304), the first color/monochrome judgment unit 15*f* performs the color/monochrome judgment process on pieces of object data in order starting from, for example, the piece having the lowest number n (step S305). Since the judgment-target object data is not a bitmap image, the first color/monochrome judgment unit 15*f* makes the color/monochrome judgment using color codes.

When the result of the judgment made by the first color/monochrome judgment unit 15*f* is color (YES in step S305), the flow shifts to step S106, where the flag setting unit 15*h* changes the flag value of the color flag of the page k to "1" (step S106). The table setting unit 15*j* initializes the unprocessed object management table T2 (step S107). Then, the process ends, and the flow shifts to step S005 in the color/monochrome judgment process.

As described above, when judgment-target object data that is not a bitmap image is judged to be in color by the first color/monochrome judgment unit 15f, the color/monochrome judgment is not made on all of the pieces of object data of the page k, and the color/monochrome judgment on the page k immediately terminates.

Meanwhile, when the result of the judgment made by the first color/monochrome judgment unit 15f is monochrome (NO in step S305), the table setting unit 15j deletes, from the unprocessed object management table T2, the registration of the piece of object data for which the judgment has been made (step S306), the flow returns to step S304, and the aforementioned processes are repeated.

In embodiment 2, the printing control apparatus 10 preferentially makes the color/monochrome judgment on a piece of object data of a particular type included in the page k. Such a configuration may shorten the processing time required for the judgment process.

The following will describe embodiment 3.

An application of the invention will be described with reference to embodiment 3. With reference to embodiment 3, descriptions will be given of an example in which, when a highlighting effect is set using the highlighting-effect-setting screen depicted in FIGS. 8A and 8B, every print-target page is judged as to whether it includes object data corresponding to a specified highlighting effect, wherein the color mode is selected (set) for those pages with object data corresponding to the specified highlighting effect, and the monochrome mode is selected (set) for those pages without object data corresponding to the specified highlighting effect.

The basic configurations of the apparatuses forming the print system 100 in accordance with embodiment 3 are the same as those in embodiment 1. However, the judgment unit 15a and the first color/monochrome judgment unit 15f provide functions slightly different from those provided by the judgment unit 15a and the first color/monochrome judgment unit 15f in embodiment 1.

Figure 8A:
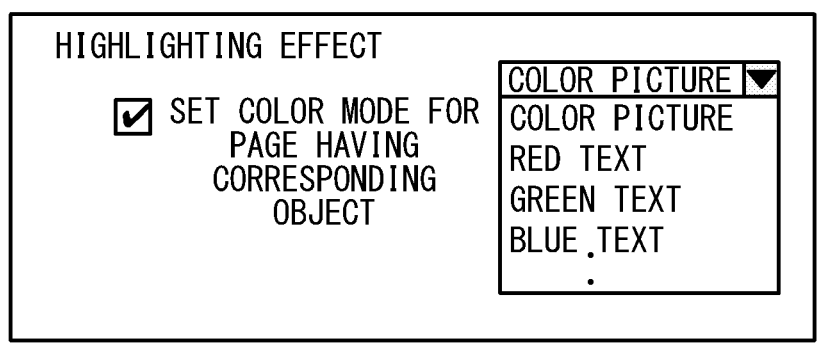
FIGS. 8A and 8B illustrate exemplary screens for setting a highlighting effect in accordance with embodiment 3.
Figure 8B:
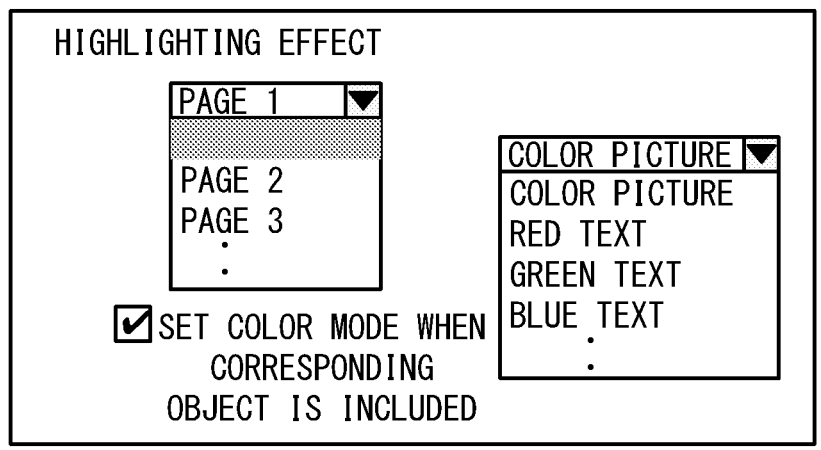

Embodiment 3 is based on the assumption that, in making print settings by operating the operation unit 14, the user of the printing control apparatus 10 sets a highlighting setting using the highlighting-effect setting screen illustrated in FIGS. 8A and 8B. Both FIGS. 8A and 8B illustrate an exemplary screen for setting a highlighting effect in accordance with embodiment 3. With reference to FIGS. 8A and 8B, the setting of a highlighting effect becomes effective when, for example, a checkbox is checked, and the color mode is used for a page on which object data corresponding to the highlighting effect selected by the user is placed.

The highlighting-effect setting screens depicted in FIGS. 8A and 8B are mere examples, and, for example, a configuration may be made in a manner such that, as depicted in FIG. 8B, a different highlighting effect can be designated for each print-target page. Such a configuration allows a different type of object data to be highlighted for each page, thereby improving user convenience.

In addition to performing the judgment process described with reference to embodiment 1, the judgment unit 15a refers to a parameter related to the highlighting effect of the print setting so as to judge whether a designated highlighting effect indicates a color picture (in embodiment 3, a color bitmap image will be referred to as a color picture).

Using the attribute information of judgment-target object data obtained by the attribute-information obtaining unit 15d, the first color/monochrome judgment unit 15f judges whether the judgment-target object data corresponds to a designated highlighting effect, thereby judging which of color or monochrome the judgment-target object data is in. That is, when judgment-target object data corresponds to a designated highlighting effect, the first color/monochrome judgment unit 15f judges the object data to be in color; otherwise, the first color/monochrome judgment unit 15f judges the object data to be in monochrome.

More particularly, when judgment-target object data is not a bitmap image, the first color/monochrome judgment unit 15f refers to a parameter related to the highlighting effect of the print setting so as to identify a designated highlighting effect. Using a color code included in a rendering command of the judgment-target object data, the first color/monochrome judgment unit 15f judges whether the judgment-target object data corresponds to the designated highlighting effect. When the judgment-target object data corresponds to the designated highlighting effect, the first color/monochrome judgment unit 15f judges the judgment-target object data to be in color; otherwise, the first color/monochrome judgment unit 15f judges the object data to be in monochrome.

Assume that the designated highlighting effect is green text and that judgment-target object data is text data and has the color code 0xFF008000. The color code expresses ($\alpha$, R, G, B)=(255, 0, 128, 0), indicating that the judgment-target object data (text data) is rendered in a color in the green range. That is, the object data in this case corresponds to the designated highlighting effect, and hence the first color/monochrome judgment unit 15f judges the object data to be in color.

For judgment-target object data that is a bitmap image, the first color/monochrome judgment unit 15f makes the color/monochrome judgment using the format of the bitmap image. That is, the first color/monochrome judgment unit 15f makes the color/monochrome judgment using a value (biBitCount) specifying the number of bits per pixel in the format of the bitmap image.

Figure 9:
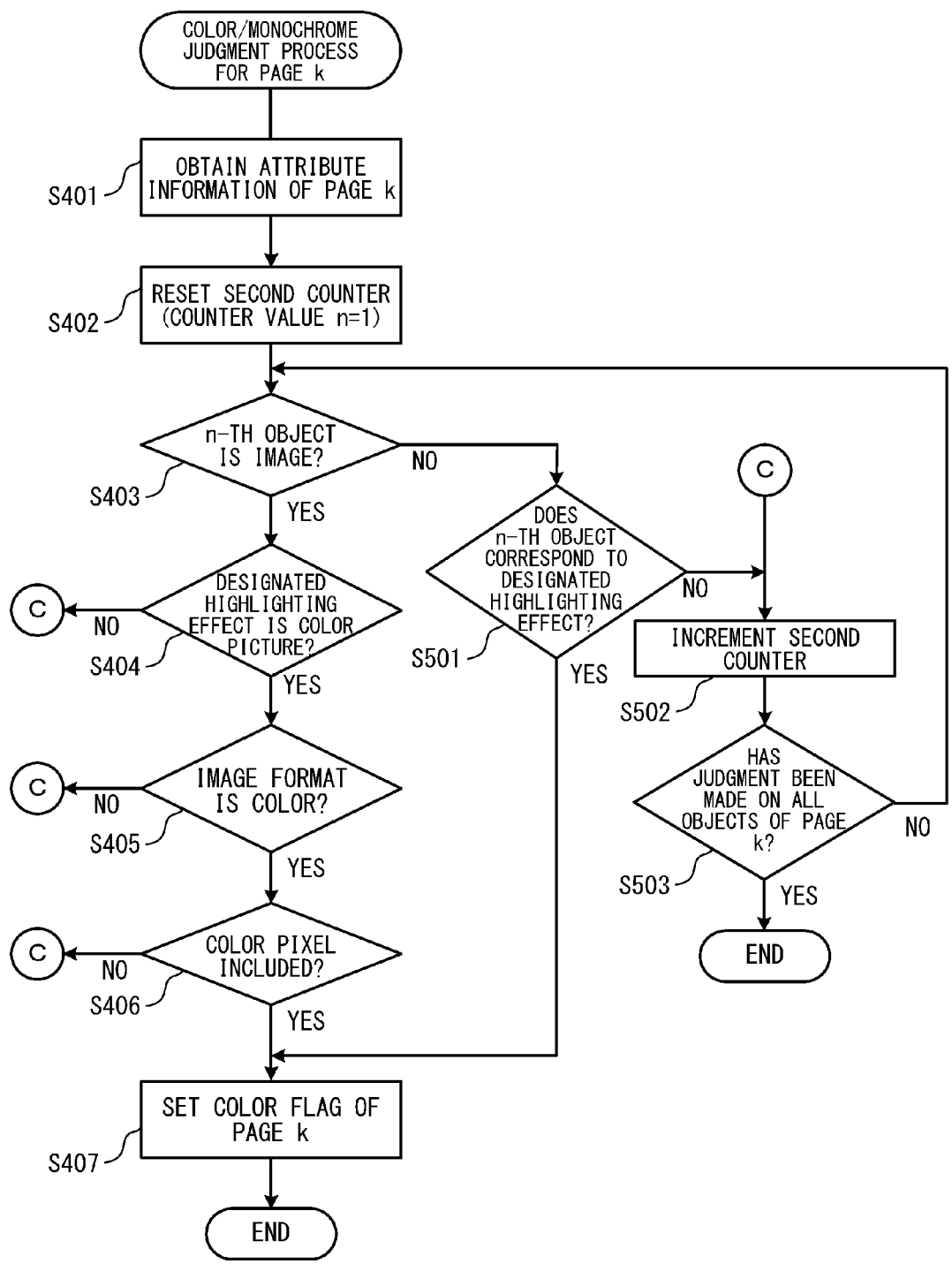
FIG. 9 is an exemplary flowchart illustrating the flow of a color/monochrome judgment process for a page k in accordance with embodiment 3.

With reference to FIG. 9, the following will describe the flow of a color/monochrome judgment process for a page k in accordance with embodiment 3. FIG. 9 is an exemplary flowchart illustrating the flow of a color/monochrome judgment process for a page k in accordance with embodiment 3. This color/monochrome judgment process for a page k corresponds to the process of step S004 of the aforementioned color/monochrome judgment process. Note that the color/monochrome judgment process in accordance with embodiment 3 is the same as the color/monochrome judgment process in accordance with embodiment 1.

The attribute-information obtaining unit 15d analyzes intermediate data so as to obtain attribute information of each piece of object data of the page k (step S401). The control unit 15 resets the second counter 15e (counter value n=1) (step S402).

The judgment unit 15a judges whether an n-th piece of object data of the page k is a bitmap image (step S403). When the judgment unit 15a judges that the n-th piece of object data is a bitmap image (YES in step S403), the judgment unit 15a refers to a parameter related to the highlighting effect of the print setting so as to judge whether the designated highlighting effect is a color picture (step S404).

When the judgment unit 15a judges that the designated highlighting effect is not a color picture (NO in step S404), the flow shifts to step S502, which will be described hereinafter.

Meanwhile, when the judgment unit 15a judges that the designated highlighting effect is a color picture (YES in step S404), the first color/monochrome judgment unit 15f makes the color/monochrome judgment using the format of the bitmap image (step S405).

When the result of the judgment made by the first color/monochrome judgment unit 15f is monochrome (NO in step S405), the flow shifts to step S502, which will be described hereinafter. Meanwhile, when the result of the judgment made by the first color/monochrome judgment unit 15f is color (YES in step S405), the second color/monochrome judgment unit 15g makes the color/monochrome judgment for each pixel of the judgment-target object data (step S406).

When the second color/monochrome judgment unit 15g judges that the judgment-target object data does not include a color pixel (NO in step S406), the flow shifts to step S502, which will be described hereinafter.

Meanwhile, when the second color/monochrome judgment unit 15g judges that the judgment-target object data includes a color pixel (YES in step S406), the flag setting unit 15h changes the flag value of the color flag of the page k to "1" (step S407). Then, the process ends, and the flow shifts to step S005 of the color/monochrome judgment process.

As described above, when the designated highlighting effect is a color picture and the second color/monochrome judgment unit 15g judges that judgment-target object data is color data, the color/monochrome judgment is not made on all of the pieces of object data of the page k, and the color/monochrome judgment on the page k immediately terminates.

When the judgment unit 15a judges in step S403 that the n-th piece of object data is not a bitmap image (NO in step S403), the first color/monochrome judgment unit 15f makes the color/monochrome judgment on the piece of judgment-target object data by judging, using color codes, whether the piece of judgment-target object data corresponds to the designated highlighting effect (step S501). In this case, when the designated highlighting effect is, for example, a color picture, the first color/monochrome judgment unit 15f gives a judgment of NO (monochrome).

When the result of the judgment made by the first color/monochrome judgment unit 15f is color (YES in step S501), the flow shifts to step S407, where the flag setting unit 15h changes the flag value of the color flag of the page k to "1" (step S407). Then, the process ends, and the flow shifts to step S005 of the color/monochrome judgment process.

As described above, when judgment-target object data that is not a bitmap image is judged to be in color by the first color/monochrome judgment unit 15f, the color/monochrome judgment is not made on all of the pieces of object data of the page k, and the color/monochrome judgment on the page k immediately terminates.

Meanwhile, when the result of the judgment made by the first color/monochrome judgment unit 15f is monochrome (NO in step S501), the control unit 15 increments the second counter 15e (step S502), and the judgment unit 15a judges whether the color/monochrome judgment has been made on all of the pieces of object data of the page k (step S503).

When the judgment unit 15a judges that the color/monochrome judgment has not been made on all of the pieces of object data of the page k (NO in step S503), the flow returns to step S403, and the aforementioned processes are repeated.

Meanwhile, when the judgment unit 15a judges that the color/monochrome judgment has been made on all of the pieces of object data of the page k (YES in step S503), the process ends, and the flow shifts to step S005 of the color/monochrome judgment process. In this case, the flag value of the color flag of the page k in the color/monochrome management table T1 does not change.

In embodiment 3, when a highlighting effect is designated, the printing control apparatus 10 judges whether judgment-target object data corresponds to the designated highlighting effect. When the judgment-target object data corresponds to the designated highlighting effect, the color mode is set for a page on which the judgment-target object data is placed; when any of the pieces of object data of the judgment-target page does not correspond to the designated highlighting effect, the monochrome mode is set for the judgment-target page. In such a configuration, the user herself/himself does not need to make a setting by checking each page including an item that needs to be highlighted, and the color mode or monochrome mode can be properly automatically set for each page. Accordingly, user convenience can be improved.

In embodiment 3, in a case where one piece of object data from among the pieces of object data of page k corresponds to a designated highlighting effect, the printing control apparatus 10 immediately sets the color mode for the page k even when the pieces of object data of the page k include a piece that has not been judged. Such a configuration may shorten the processing time.

In embodiment 3, in a case where a designated highlighting effect is a color picture, the printing control apparatus 10 judges that judgment-target object data rendered in grayscale is monochrome, even when the judgment-target object data corresponds to the designated highlighting effect. In such a configuration, the monochrome mode is set for object data rendered in grayscale even when the object data corresponds to a designated highlighting effect, thereby enabling the print cost to be decreased.

The following will describe embodiment 4.

Another application of the invention will be described with reference to embodiment 4. Embodiment 4 will be described with reference to a process performed when "designated object is not printed" is checked in a designated-object-printing setting screen depicted in FIG. 11.

FIG. 10 is a functional block diagram illustrating an exemplary configuration of a printing control apparatus 10 forming a print system 100 in accordance with embodiment 4. The basic configuration of the printing control apparatus 10 in accordance with embodiment 4 is the same as the basic configuration of the printing control apparatus 10 in accordance with embodiment 1. However, as illustrated in FIG. 10, embodiment 4 is different from embodiment 1 in the sense that the control unit 15 includes the table setting unit 15j, a first designated-object judgment unit 15k, and a second designated-object judgment unit 15l, and that the control unit 15 does not include the first color/monochrome judgment unit 15f, the second color/monochrome judgment unit 15g, and the flag setting unit 15h. The judgment unit 15a and the job-data generating unit 15i provide functions slightly different from those provided by the judgment unit 15a and the job-data generating unit 15i in embodiment 1. Embodiment 4 is also different from embodiment 1 in the sense that the storage unit 12 stores a designated-object management table T3, not the color/monochrome management table T1.

The first designated-object judgment unit 15k and the second designated-object judgment unit 15l in accordance with embodiment 4 are function units corresponding to the first color/monochrome judgment unit 15f and the second color/monochrome judgment unit 15g, respectively.

Figure 11:
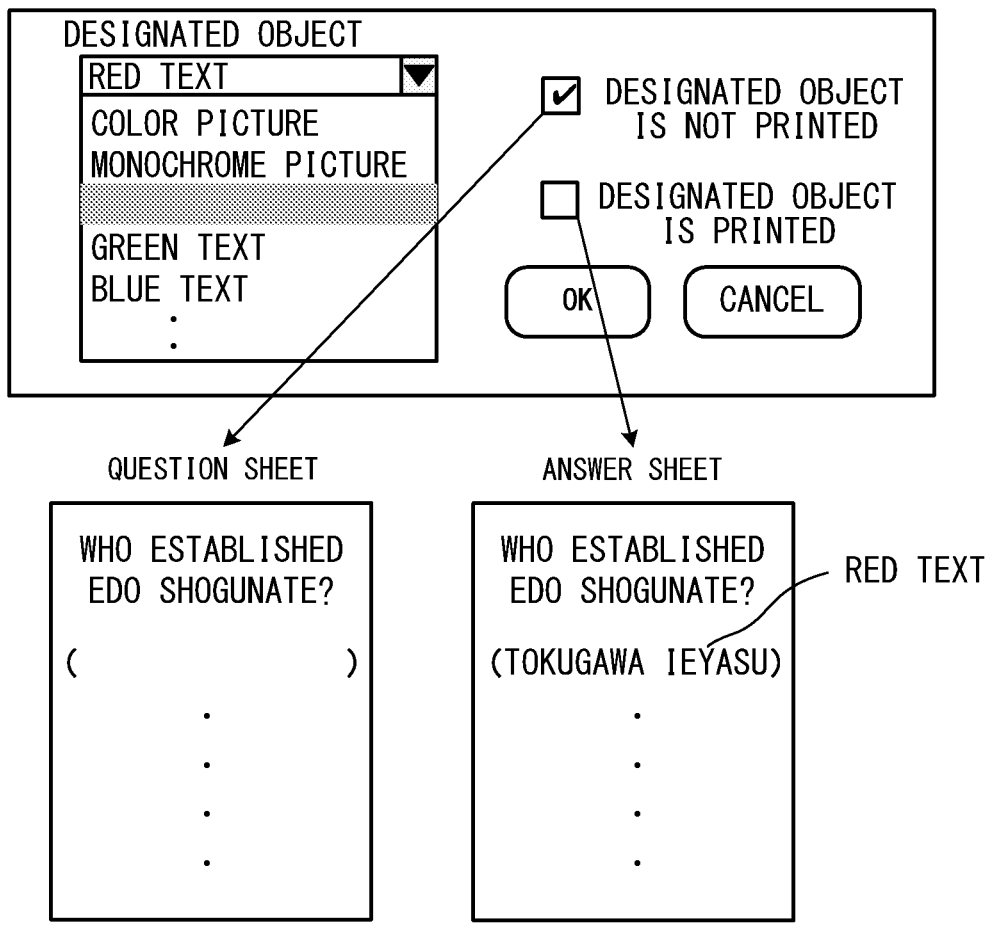
FIG. 11 illustrates an example of a designated-object-printing setting screen in accordance with embodiment 4, and specific examples for settings.

Embodiment 4 is based on the assumption that, in making print settings by operating the operation unit 14, the user of the printing control apparatus 10 makes a setting for selecting a designated object using the designated-object-printing setting screen illustrated in FIG. 11. FIG. 11 illustrates an example of a designated-object-printing setting screen in accordance with embodiment 4, and specific examples for settings. Referring to FIG. 11, print settings for a designated object may be made to be effective by selecting a desired type from a list of types of object data including color elements and by checking a checkbox corresponding to a desired setting before selecting an OK button.

Referring to FIG. 11, selecting red text as a designated object and setting "designated object is not printed" may generate job data for a question sheet from which an "answer" rendered in red text has been excluded; setting "designated object is printed" may generate job data for an answer sheet including "answer" rendered in red text.

FIG. 12 illustrates an example of a designated-object management table T3 in accordance with embodiment 4. The designated-object management table T3 is managed by the table setting unit 15*j*. The job-data generating unit 15*i* refers to the designated-object management table T3 to generate job data. As illustrated in FIG. 12, the designated-object management table T3 associates "page" and "order" with each other.

The page number (i.e., the counter value k of the first counter 15*c*) of a page on which is placed object data corresponding to a designated object identified in a designated-object identifying process, which will be described in detail hereinafter, is stored in the field "page"; the counter value n of the second counter 15*e* corresponding to the object data is stored in the field "order".

Descriptions will be given with reference to FIG. 10 again. The control unit 15 consists of, for example, a CPU. The control unit 15 executes an operation program stored in a program area of the storage unit 12 so as to achieve, as depicted in FIG. 10, functions as the judgment unit 15*a*, the intermediate-data generating unit 15*b*, the first counter 15*c*, the attribute-information obtaining unit 15*d*, the second counter 15*e*, the job-data generating unit 15*i*, the table setting unit 15*j*, the first designated-object judgment unit 15*k*, and the second designated-object judgment unit 15*l*, and so as to perform processes including a designated-object identifying process and a process of controlling the entirety of the printing control apparatus 10.

The judgment unit 15*a* refers to a parameter related to the designated-object-printing setting of the print setting so as to judge whether "designated object is not printed" has been set. The judgment unit 15*a* refers to a parameter related to the designated-object print setting of the print setting so as to judge whether the designated object type is a picture (note that a bitmap image is referred to as a picture in embodiment 4). When the judgment unit 15*a* judges that the designated object is a picture, the judgment unit 15*a* further judges whether the designated object is a color picture.

The judgment unit 15*a* judges whether the identifying process has been performed for all print-target pages. More particularly, the judgment unit 15*a* judges whether the counter value k of the first counter 15*c* has exceeded the number of print-target pages, so as to judge whether the identifying process has been performed on all print-target pages.

The judgment unit 15*a* judges whether an n-th piece of object data corresponding to the counter value n of the second counter 15*e* is a bitmap image such as a JPEG image or a GIF image. More particularly, the judgment unit 15*a* analyzes attribute information of judgment-target object data obtained by the attribute-information obtaining unit 15*d* and judges, using, for example, a file type, whether the object data is a bitmap image.

The judgment unit 15*a* also judges whether all pieces of object data of the page k have been judged as to whether they correspond to the designated object. More particularly, the judgment unit 15*a* judges whether the counter value n of the second counter 15*e* has exceeded the number of pieces of object data of the page k, so as to judge whether all pieces of object data of the page k have been judged as to whether they correspond to the designated object.

When "designated object is not printed" has been set, the job-data generating unit 15*i* refers to the designated-object management table T3 so as to generate job data from which the object data registered in the designated-object management table T3 has been excluded. The job-data generating unit 15*i* transmits the generated job data to a designated printing apparatus 20 using the communication unit 11. Referring to, for example, FIG. 12, the job-data generating unit 15*i* generates, for page 1, job data from which the pieces of object data corresponding to n1, n2, and n3, i.e., counter values of the second counter 15*e*, have been excluded.

Descriptions will be given with reference to FIG. 10 again. When the first designated-object judgment unit 15*k* or the second designated-object judgment unit 15*l* judges that judgment-target object data corresponds to a designated object, the table setting unit 15*j* registers the page number of a page on which the judgment-target object data is placed (i.e., the counter value k of the first counter 15*c*) and the counter value n of the second counter 15*e* in the designated-object management table T3 in association with each other. When the counter value k of the first counter 15*c* satisfies k=3 and the counter value n of the second counter 15*e* satisfies n=5, the table setting unit 15*j* stores "3" in the field "page" and "5" in the corresponding field "order".

Using the attribute information of judgment-target object data obtained by the attribute-information obtaining unit 15*d*, the first designated-object judgment unit 15*k* judges whether judgment-target object data corresponds to a designated object.

More particular, when judgment-target object data is not a bitmap image, the first designated-object judgment unit 15*k* refers to a parameter related to the designated-object-printing setting of the print setting so as to identify the type of the designated object. Using a color code included in a rendering command of the judgment-target object data, the first designated-object judgment unit 15*k* judges whether the judgment-target object data corresponds to the designated object.

Assume that the designated object is red text and that judgment-target object data is text data and has the color code 0xFF800000. In this case, the color code expresses (α, R, G, B)=(255, 128, 0, 0), indicating that the judgment-target object data (text data) is rendered in a color in the red range. That is, in this case, the first designated-object judgment unit 15*k* judges that the object data corresponds to the designated object.

For judgment-target object data that is a bitmap image, the first designated-object judgment unit 15*k* judges, using the format of the bitmap image, whether the judgment-target object data corresponds to a designated object. That is, using a value (biBitCount) specifying the number of bits per pixel in the format of the bitmap image, the first designated-object judgment unit 15*k* judges which of color or monochrome the judgment-target object data is in, so as to judge whether the judgment-target object data corresponds to the designated object.

More particularly, in the case where the designated object is a monochrome picture and the value (biBitCount) specifying the number of bits per pixel in the format of the bitmap image indicates monochrome (black-and-white bitmap), the first designated-object judgment unit 15*k* judges that the judgment-target object data corresponds to the designated object. In the case where the designated object is a color picture and the value (biBitCount) specifying the number of bits per pixel in the format of the bitmap image indicates color, the first designated-object judgment unit 15*k* judges that the judgment-target object data corresponds to the designated object.

When judgment-target object data is a bitmap image judged to be in color by the first designated-object judgment unit 15*k*, the second designated-object judgment unit 15*l* makes the color/monochrome judgment on each of the pixels of the judgment-target object data in order starting from, for example, pixels at the upper-left end, thereby judging whether judgment-target object data corresponds to the designated object.

More particularly, in the case where the designated object is a color picture and the first designated-object judgment unit 15*k* judges that judgment-target object data corresponds to the designated object, the second designated-object judgment unit 15*l* makes the color/monochrome judgment on each of the pixels of the judgment-target object data, thereby judging whether judgment-target object data corresponds to the designated object. In this case, when the second designated-object judgment unit 15*l* judges a certain pixel to have a color, the second designated-object judgment unit 15*l* does not make the color/monochrome judgment on the following pixels and decides that the judgment-target object data is in color and corresponds to the designated object. Meanwhile, when all of the pixels are grayscale pixels, the second designated-object judgment unit 15*l* judges that the judgment-target object data does not correspond to the designated object.

In the case where the designated object is a monochrome picture and the first designated-object judgment unit 15*k* determines that judgment-target object data does not correspond to the designated object, the second designated-object judgment unit 15*l* makes the color/monochrome judgment on each of the pixels of the judgment-target object data, thereby judging whether judgment-target object data corresponds to the designated object. When all of the pixels are grayscale pixels, the second designated-object judgment unit 15*l* judges that the judgment-target object data corresponds to the designated object; when a color pixel is present, the second designated-object judgment unit 15*l* judges that the judgment-target object data does not correspond to the designated object.

Figure 13:
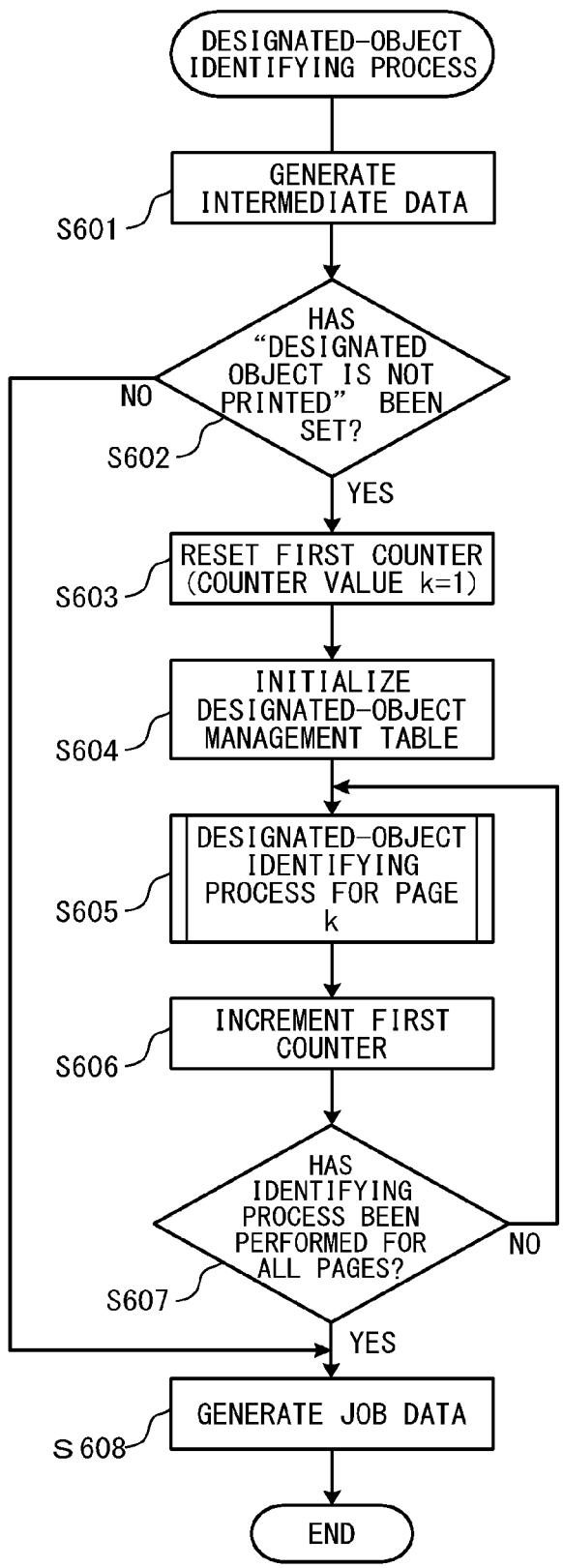
FIG. 13 is an exemplary flowchart illustrating the flow of a designated-object identifying process in accordance with embodiment 4.

With reference to FIG. 13, the following will describe a designated-object identifying process in accordance with embodiment 4. FIG. 13 is an exemplary flowchart illustrating the flow of a designated-object identifying process in accordance with embodiment 4. The designated-object identifying process starts in response to the user operating the operation unit 14 to give a print instruction that includes a designated-object print setting.

A print instruction is made to cause the intermediate-data generating unit 15*b* to generate intermediate data using print-target data and to store the intermediate data in the storage unit 12 (step S601). The judgment unit 15*a* refers to a parameter related to the designated-object-printing setting of a print setting so as to judge whether "designated object is not printed" has been set (step S602).

When the judgment unit 15*a* judges that "designated object is printed" has been set (NO in step S602), ordinary job data is generated, and the communication unit 11 transmits the job data to a designed printing apparatus 20 (step S608). Then, the process ends.

Meanwhile, when the judgment unit 15*a* judges that "designated object is not printed" has been set (YES in step S602), the control unit 15 resets the first counter 15*c* (counter value k=1) (step S603), and the table setting unit 15*j* initializes the designated-object management table T3 (step S604).

The first designated-object judgment unit 15*k* performs the designated-object identifying process for a page k in cooperation with, for example, the attribute-information obtaining unit 15*d* (step S605). When the designated-object identifying process for the page k ends, the control unit 15 increments the first counter 15*c* (step S606), and the judgment unit 15*a* judges whether the identifying process has been performed for all of the pages of the print target (step S607).

When the judgment unit 15*a* judges that the identifying process has not been performed for all of the pages of the print target (NO in step S607), the flow returns to step S605, and the aforementioned processes are repeated.

Meanwhile, when the judgment unit 15*a* judges that the identifying process has been performed for all of the pages of the print target (YES in step S607), the job-data generating unit 15*i* refers to the designated-object management table T3 so as to generate job data from which the object data registered in the designated-object management table T3 has been excluded, and causes the communication unit 11 to transmit the generated job data to a designated printing apparatus 20 (step S608). Then, the process ends.

With reference to FIG. 14, the following will describe the flow of the designated-object identifying process for a page k in accordance with embodiment 4. FIG. 14 is an exemplary flowchart illustrating the flow of a designated-object identifying process for a page k in accordance with embodiment 4. This designated-object identifying process for a page k corresponds to the process of step S605 of the aforementioned designated-object identifying process.

The attribute-information obtaining unit 15*d* analyzes intermediate data so as to obtain attribute information of each piece of object data of the page k (step S701). The control unit 15 resets the second counter 15*e* (counter value n=1) (step S702).

The judgment unit 15*a* judges whether an n-th piece of object data of the page k is a bitmap image (step S703). When the judgment unit 15*a* judges that the n-th piece of object data is a bitmap image (YES in step S703), the judgment unit 15*a* refers to a parameter related to the designated-object-printing setting of a print setting so as to judge whether the designated object type is a picture (step S704).

When the judgment unit 15*a* judges that the designated object is not a picture (NO in step S704), the flow shifts to step S902, which will be described hereinafter. Meanwhile, when the judgment unit 15*a* judges that the designated object is a picture (YES in step S704), the judgment unit 15*a* further judges whether the designated object is a color picture (step S705).

When the judgment unit 15*a* judges that the designated object is a color picture (YES in step S705), the first designated-object judgment unit 15*k* judges, using the format of the bitmap image, whether the judgment-target object data corresponds to the designated object (step S706).

When the first designated-object judgment unit 15k judges that the judgment-target object data does not correspond to the designated object (NO in step S706), i.e., when the format of the bitmap image is indicated as being monochrome, the flow shifts to step S902, which will be described hereinafter.

Meanwhile, when the first designated-object judgment unit 15k judges that the judgment-target object data corresponds to the designated object (YES in step S706), i.e., when the format of the bitmap image is indicated as being color, the second designated-object judgment unit 15l makes the color/monochrome judgment on each pixel of the judgment-target object data and judges whether the judgment-target object data corresponds to the designated object (step S707).

When the second designated-object judgment unit 15l judges that the judgment-target object data does not correspond to the designated object (NO in step S707), i.e., when all of the pixels are grayscale pixels, the flow shifts to step S902, which will be described hereinafter.

Meanwhile, when the second designated-object judgment unit 15l judges that the judgment-target object data corresponds to the designated object (YES in step S707), i.e., when a color pixel is present, the table setting unit 15j additionally registers the page number of a page on which the judgment-target object data is placed (i.e., the counter value k of the first counter 15c) and the counter value n of the second counter 15e in the designated-object management table T3 in association with each other (step S708). Then, the flow shifts to step S902, which will be described hereinafter.

When the judgment unit 15a judges in step S705 that the designated object is a monochrome picture (NO in step S705), the first designated-object judgment unit 15k judges, using the format of the bitmap image, whether the judgment-target object data corresponds to the designated object (step S801).

When the first designated-object judgment unit 15k judges that the judgment-target object data corresponds to the designated object (YES in step S706), i.e., when the format of the bitmap image is indicated as being monochrome, the flow shifts to step S708.

Meanwhile, when the first designated-object judgment unit 15k judges that the judgment-target object data does not correspond to the designated object (NO in step S801), i.e., when the format of the bitmap image is indicated as being color, the second designated-object judgment unit 15l makes the color/monochrome judgment on each pixel of the judgment-target object data and judges whether the judgment-target object data corresponds to the designated object (step S802).

When the second designated-object judgment unit 15l judges that the judgment-target object data corresponds to the designated object (YES in step S802), i.e., when all of the pixels are grayscale pixels, the flow shifts to step S708.

Meanwhile, when the second designated-object judgment unit 15l judges that the judgment-target object data does not correspond to the designated object (NO in step S802), the flow shifts to step S902, which will be described hereinafter.

When the judgment unit 15a judges in step S703 that the n-th piece of object data is not a bitmap image (NO in step S703), the first designated-object judgment unit 15k judges, using color codes, whether the judgment-target object data corresponds to the designated object (step S901).

When the first designated-object judgment unit 15k judges that the judgment-target object data corresponds to the designated object (YES in step S901), the flow shifts to step S708.

Meanwhile, when the first designated-object judgment unit 15k judges that the judgment-target object data does not correspond to the designated object (NO in step S901), the control unit 15 increments the second counter 15e (step S902), and the judgment unit 15a judges whether all pieces of object data of the page k have been judged as to whether they correspond to the designated object (step S903).

When the judgment unit 15a judges that not every piece of object data of the page k has been judged as to whether it corresponds to the designated object (NO in step S903), the flow returns to step S703, and the aforementioned processes are repeated.

Meanwhile, when the judgment unit 15a judges that every piece of object data of the page k has been judged as to whether it corresponds to the designated object (YES in step S903), the process ends, and the flow shifts to step S606 of the designated-object identifying process.

In embodiment 4, when "designated object is not printed" has been set, the printing control apparatus 10 identifies object data corresponding to a designated object and generates job data from which the identified object data has been excluded. Such a configuration allows a plurality of types of job data to be generated using one draft so that user convenience can be improved.

Embodiments 1-3 were described under a condition in which the printing control apparatus 10 manages the color/monochrome judgment process, but the printing apparatus 20 may be configured to include the aforementioned function units so that the printing apparatus 20 can manage the color/monochrome judgment process. Such a configuration enables the color/monochrome judgment process to be performed on, for example, print-target data retrieved from a USB (Universal Serial Bus) memory.

Embodiment 2 was described with reference to a situation in which the color/monochrome judgment process is performed preferentially on a bitmap image included in the object data of a page k, but the color/monochrome judgment may be made initially on, for example, non-bitmap-image object data. The second color/monochrome judgment unit 15g does not need to make the color/monochrome judgment on bitmap-image object data soon after this data is judged to be in color by the first color/monochrome judgment unit 15f, i.e., the second color/monochrome judgment unit 15g may make the color/monochrome judgment afterwards. Using, for example, the file format of a print target, a judgment may be made as to which type of object data of a page k the color/monochrome judgment is to be preferentially made on.

Embodiment 4 was described under a condition in which, in accordance with the setting, object data corresponding to a designated object is printed or is not printed; however, in accordance with the setting, job data for applying a predetermined process (e.g., a process of painting over object data corresponding to a designated object, a process of highlighting an item (using bold lines, heightening a color, changing a font) to object data corresponding to a designated object) may be generated. In accordance with the setting, a specific process may be performed on object data corresponding to a designated object.

The designated-object-printing setting screen in accordance with embodiment 4 may be configured in a manner such that, as described above with reference to embodiment 3, a different designated object can be selected for each page.

An operation program for performing the aforementioned operations may be stored in a computer-readable recording medium such as a flexible disk, CD-ROM (Compact Disk-Read Only Memory), DVD (Digital Versatile Disk), or MO (Magneto Optical Disk) and installed in a computer such as the printing control apparatus 10 so as to perform the aforementioned processes. In addition, the operation program may be stored in, for example, a disk apparatus of a server apparatus on the Internet and superimposed on carrier waves for transmitting information so that a computer can download the operation program.

Embodiments of the invention have been described, but the invention is not limited to the described embodiments. The invention can have various configurations and embodiments without departing from the sprit thereof.

What is claimed is:

1. A printing control method comprising:
generating, using a piece of data on a print target, a piece of intermediate data for each individual piece of object data;
first judging, using attribute information of a piece of object data included in the piece of intermediate data, whether the piece of object data is an image in an intermediate data format;
second judging, using a color code included in the attribute information, which of color or monochrome the piece of object data is in;
third judging which of color or monochrome each individual pixel of the piece of object data is in when the piece of object data is judged to be an image in the intermediate data format and is judged to be in color by the second judging; and
when the piece of object data is judged to include a color pixel by third judging, generating a piece of job data in a raster data format that sets a color mode for a page of the print target on which the piece of object data is placed.

2. The printing control method according to claim 1, further comprising using a printing control apparatus to preferentially judge a particular type of object data of the page.

3. The printing control method according to claim 1, wherein in a case where a color pixel is judged to be present by the third judging, even when pieces of object data of a page on which the piece of object data is placed includes a piece of object data that has not been judged, and using a printing control apparatus to set the color mode for the page without judging the piece of object data that has not been judged.

4. The printing control method according to claim 1, wherein in a case where a highlighting target type that is a type of object data to be printed in the color mode is designated, the second judging, using the attribute information, whether the piece of object data corresponds to object data of the highlighting target type, and when the piece of object data corresponds to object data of the highlighting target type, the piece of object data is judged to be in color by the second judging;
otherwise, the piece of object data is judged to be in monochrome by the second judging.

5. A printing control method comprising:
generating, using a piece of data on a print target, a piece of intermediate data for each individual piece of object data;
first judging, using attribute information of a piece of object data included in the piece of intermediate data, whether the piece of object data is an image in an intermediate data format;
when the piece of object data is an image in an intermediate data format, second judging, using the attribute information, whether the piece of object data is in color, so as to judge whether the piece of object data corresponds to a designated object indicating a type of object data including a color element, the designated object is designated in a print setting;
when the piece of object data is judged to be in color by the second judging, third judging which of color or monochrome each individual pixel of the image in the intermediate data format is in, so as to judge whether the piece of object data corresponds to the designated object; and
generating a piece of job data in a raster data format by applying a predetermined process to a piece of object data judged to correspond to the designated object by the third judging.

6. A non-transitory computer-readable recording medium having stored therein a program for causing a computer of a printing control apparatus to perform a process comprising:
generating, using a piece of data on a print target, a piece of intermediate data for each individual piece of object data;
judging, using attribute information of a piece of object data included in the piece of intermediate data, whether the piece of object data is an image in an intermediate data format;
judging, using a color code included in the attribute information, which of color or monochrome the piece of object data is in;
judging which of color or monochrome each individual pixel of the piece of object data is in when the piece of object data is judged to be an image in the intermediate data format and is judged to be in color using a color code included in the attribute information; and
when the piece of object data is judged to include a color pixel, generating a piece of job data in a raster data format that sets a color mode for a page of the print target on which the piece of object data is placed.

* * * * *